US011503468B2

(12) United States Patent
Asher et al.

(10) Patent No.: US 11,503,468 B2
(45) Date of Patent: Nov. 15, 2022

(54) SYSTEM AND METHOD FOR CONTINUOUSLY VALIDATING AND AUTHENTICATING A HOST AND SENSOR PAIR

(71) Applicant: Sygnali, LLC, Bellevue, WA (US)

(72) Inventors: Todd Asher, Sammamish, WA (US); Henry H. Hair, IV, Cumming, GA (US); Pete Richardson, Shoreline, WA (US); Paul I. Kirk, Kenmore, WA (US); Darren Peterson, Redmond, WA (US)

(73) Assignee: SYGNALI LLC, Bellevue, WA (US)

(*) Notice: Subject to any disclaimer, the term of this patent is extended or adjusted under 35 U.S.C. 154(b) by 618 days.

(21) Appl. No.: 16/596,523

(22) Filed: Oct. 8, 2019

(65) Prior Publication Data

US 2020/0112856 A1 Apr. 9, 2020

Related U.S. Application Data

(60) Provisional application No. 62/742,827, filed on Oct. 8, 2018.

(51) Int. Cl.
*H04W 12/065* (2021.01)
*G06N 3/08* (2006.01)
*G06N 3/04* (2006.01)

(52) U.S. Cl.
CPC ............ *H04W 12/065* (2021.01); *G06N 3/04* (2013.01); *G06N 3/08* (2013.01)

(58) Field of Classification Search
CPC .......... H04W 12/065; G06N 3/08; G06N 3/04
See application file for complete search history.

(56) References Cited

U.S. PATENT DOCUMENTS

| 8,564,446 | B2* | 10/2013 | Gunderson | ........... B60W 40/09 |
| | | | | 340/576 |
| 10,171,969 | B2* | 1/2019 | Lam | ........................ H04W 4/38 |
| 10,389,459 | B2* | 8/2019 | Daoura | ............... H04W 12/033 |
| 10,445,928 | B2* | 10/2019 | Nehmadi | ............... G06T 3/4007 |
| 10,837,790 | B2* | 11/2020 | Singhal | ................... G05D 1/021 |
| 10,946,518 | B2* | 3/2021 | Dinius | ................. G05D 1/0223 |
| 10,997,871 | B2* | 5/2021 | Parker | ................... C12N 5/0657 |
| 11,062,030 | B2* | 7/2021 | Zhang | ..................... G06F 21/57 |
| 11,324,655 | B2* | 5/2022 | De Rossi | ............. A61H 1/0244 |
| 11,330,450 | B2* | 5/2022 | Veijalainen | ......... H04L 41/0823 |

(Continued)

*Primary Examiner* — Viral S Lakhia
(74) *Attorney, Agent, or Firm* — Rowan TELS LLC

(57) ABSTRACT

A method for operating a system to continuously validating and authenticating a host and sensor pair involves defining a sensor-host pairing and context metadata. The system receives a plurality of sensor spatiotemporal sighting events of a sensor-host pair from a plurality of collection devices. The system records the identifier, signal strength, location and time of the sighting events as sensor spatiotemporal sighting events in a controlled memory data structure. The system collects a plurality of application events related to each sensor-host pair and stores the events in the controlled memory data structure. The system constructs a behavioral model from the sensor spatiotemporal sighting events through operation of spatiotemporal tracking logic. The system receives real time sighting events and compares it to the behavioral model to identify inconsistent behavior through operation of a behavior comparator.

18 Claims, 12 Drawing Sheets

(56) References Cited

U.S. PATENT DOCUMENTS

2016/0335534 A1* 11/2016 Nere ................... G06N 3/0445
2019/0138635 A1*  5/2019 Givon .................... G06N 3/08
2021/0203485 A1*  7/2021 Afanasyeva ......... H04L 9/0897

* cited by examiner

SYSTEM AND METHOD FOR CONTINUOUSLY VALIDATING AND AUTHENTICATING A HOST AND SENSOR PAIR

CROSS-REFERENCE TO RELATED APPLICATIONS

This application claims the benefit of U.S. provisional patent application Ser. No. 62/742,827, filed on Oct. 8, 2018, the contents of which are incorporated herein by reference in their entirety.

BACKGROUND

As a method of identification, the pairing of electronic sensors with people or objects (a host) is commonplace. Ranging from sensors used to grant someone access to a building or room, to tracking the location of a vehicle or package, there is little doubt about the growing popularity of this approach to identification.

The main flaw in this method of identification is that the host can become separated from the sensor. Sometimes this occurs by accident. Sometimes it is done for convenience ("Can I borrow your card key?"). Or it can occur for underhanded reasons when a sensor is stolen or removed from its host. One of the reasons human Multi Factor Authentication (MFA) has grown in popularity is to ensure that your electronic identity and your biological identity are still paired. However, in between these authentication checkpoints, there is little verification that the sensor and its host are still together.

BRIEF SUMMARY

A method for continuously validating and authenticating host and sensor pairs involves defining a sensor-host pairing and context metadata. In the method, a plurality of sensor spatiotemporal sighting events of a sensor-host pair are received from a plurality of collection devices associated with an operating area. An identifier, signal strength, collection device location, and date and time are recorded for the plurality of sensor spatiotemporal sighting events in a controlled memory data structure. A plurality of application events related to each sensor-host pair are collected and stored in the controlled memory data structure. A behavioral model is constructed from the plurality of sensor spatiotemporal sighting events and the plurality of application events through operation of spatiotemporal tracking logic. Real time sighting events and real time application events are collected from the plurality of collection devices in the operating area. The events are compared to the behavioral model to identify inconsistent behavior from at least one sensor-host pair through operation of a behavior comparator. An alert may be generated if the inconsistent behavior is identified and communicating the alert to at least one collection device through operation of a notification controller.

A computing apparatus comprises a processor and memory storing instructions. When executed by the processor, the instructions configure the apparatus to define a sensor-host pairing and context metadata. The instructions may configure the apparatus to receive a plurality of sensor spatiotemporal sighting events of a sensor-host pair from a plurality of collection devices associated with an operating area. The instructions may configure the apparatus to record an identifier, signal strength, collection device location, and date and time for the plurality of sensor spatiotemporal sighting events in a controlled memory data structure. The instructions may configure the apparatus to collect a plurality of application events related to each sensor-host pair and storing the plurality of application events in the controlled memory data structure. The instructions may configure the apparatus to construct a behavioral model from the plurality of sensor spatiotemporal sighting events and the plurality of application events through operation of spatiotemporal tracking logic. The instructions may configure the apparatus to collect real time sighting events and real time application events from the plurality of collection devices in the operating area and comparing them to the behavioral model to identify inconsistent behavior from at least one sensor-host pair through operation of a behavior comparator. The instructions may configure the apparatus to generate an alert if the inconsistent behavior is identified and communicate the alert to at least one collection device through operation of a notification controller.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
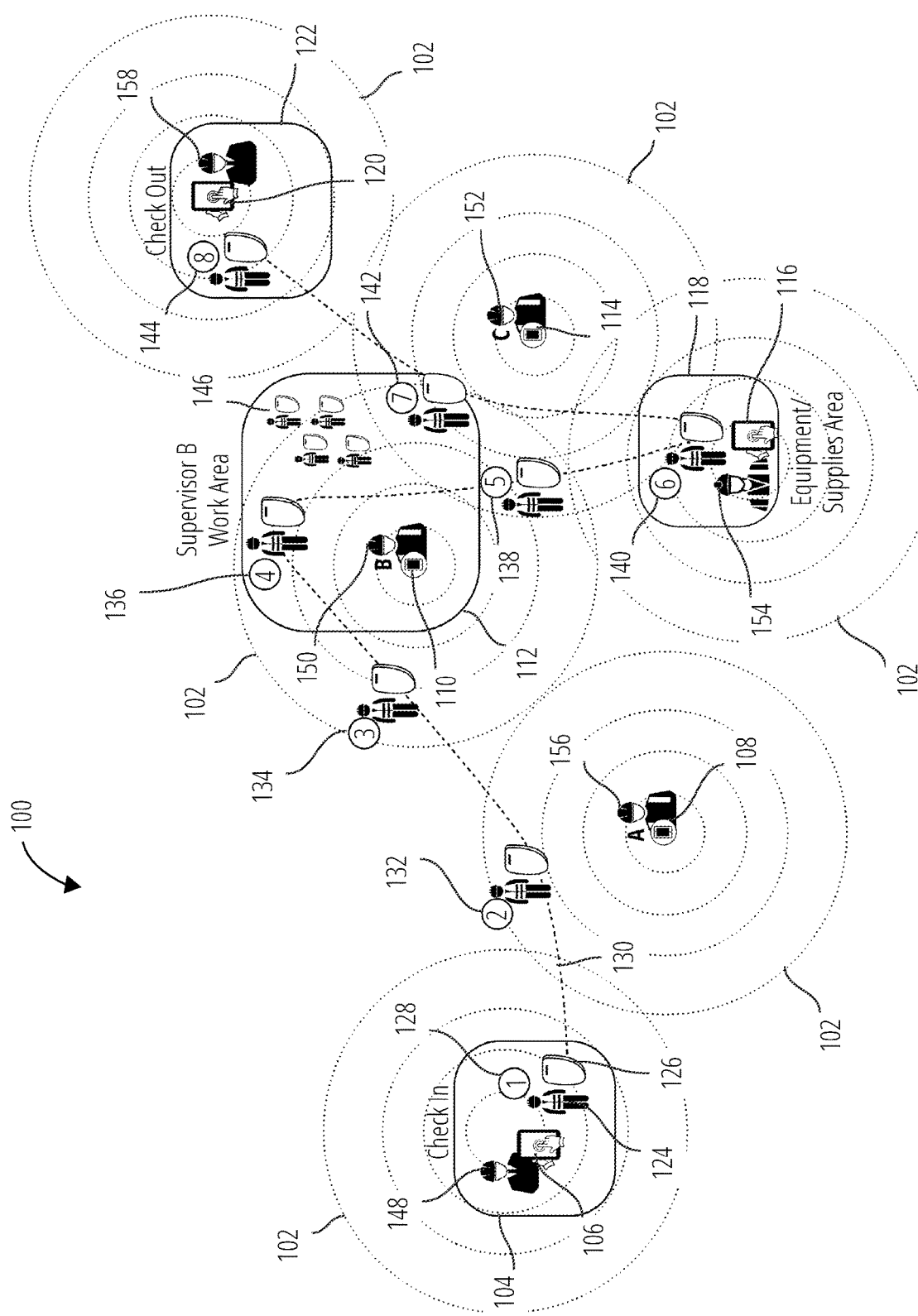
FIG. 1 illustrates a system environment 100 in accordance with one embodiment.

"Backpropagation" refers to an algorithm used in artificial neural networks to calculate a gradient that is needed in the calculation of the weights to be used in the network. It is commonly used to train deep neural networks, a term referring to neural networks with more than one hidden layer. For backpropagation, the loss function calculates the difference between the network output and its expected output, after a case propagates through the network.

"Behavioral model" refers to a spatiotemporal travel path by a sensor-host pair through an operating area.

"Collection device" refers to a device used to detect a sensor.

"Hyperbolic tangent function" refers to a function of the form $\tanh(x)=\sinh(x)/\cosh(x)$. The tanh function is a popular activation function in artificial neural networks. Like the sigmoid, the tanh function is also sigmoidal ("s"-shaped), but instead outputs values that range (−1, 1). Thus strongly negative inputs to the tanh will map to negative outputs. Additionally, only zero-valued inputs are mapped to near-zero outputs. These properties make the network less likely to get "stuck" during training.

"Identifier" refers to a unique identification of a sensor or collection device.

"Loss function" refers to also referred to as the cost function or error function (not to be confused with the Gauss error function), is a function that maps values of one or more variables onto a real number intuitively representing some "cost" associated with those values.

"Plurality of application events" refers to events related to a sensor-host pair, including but not limited to, checking in/out, assigning task, taking note/picture, assigning an asset, making a purchase, etc.

"ReLU" refers to a rectifier function, an activation function defined as the positive part of ints input. It is also known as a ramp function and is analogous to half-wave rectification in electrical signal theory. ReLu is a popular activation function in deep neural networks.

"Sensor spatiotemporal sighting events" refers to a sensor or sensor-host pair being detected as being or existing in a specified place at a specific time.

"Sensor-host pair" refers to a host that is paired with a sensor. The host may be an animate or inanimate object. The sensor may be any device that is capable of being electronically and/or visually detected by a collection device.

"Sigmoid function" refers to a function of the form $f(x)=1/(\exp(-x))$. The signmoid function is used as an activation function in artificial neural networks. It has the property of mapping a wide range of input values to the range 0-1, or sometimes −1 to 1.

"Softmax function" refers to a function of the form $f(x_i)=\exp(x_i)/\text{sum}(\exp(x))$ where the sum is taken over a set of x. Softmax is used at different layers (often at the output layer) of artificial neural networks to predict classifications for inputs to those layers. The softmax function calculates the probabilities distribution of the event xi over 'n' different events. In general sense, this function calculates the probabilities of each target class over all possible target classes. The calculated probabilities are helpful for predicting that the target class is represented in the inputs. The main advantage of using Softmax is the output probabilities range. The range will 0 to 1, and the sum of all the probabilities will be equal to one. If the softmax function used for multi-classification model it returns the probabilities of each class and the target class will have the high probability. The formula computes the exponential (e-power) of the given input value and the sum of exponential values of all the values in the inputs. Then the ratio of the exponential of the input value and the sum of exponential values is the output of the softmax function.

"Spatiotemporal tracking logic" refers to logic utilizing rule set alerts in the construction of the behavioral model. The spatiotemporal tracking logic may utilize events logs to adjust the trigger parameters of the spatiotemporal tracking rule set.

A system and method to continuously validate the unique identity of an authenticated pairing of an electronic sensor and its host using authentication devices, wireless collection devices, GPS, wireless sensors, and machine learning address this validation issue. The method and system may not be tied to specific hardware or wireless standards. Environmental factors may dictate that the ideal system be set up using low energy devices that use Bluetooth Low Energy (BLE), ZigBee, IEEE 802.11af (White-Fi) and IEEE 802.11ah (HaLow), or RFID. However, in many cases, WiFi, or longer-range standards like LTE or LoRa may be suitable.

A method for continuously validating and authenticating host and sensor pairs involves defining a sensor-host pairing and context metadata. In the method, a plurality of sensor spatiotemporal sighting events of a sensor-host pair are received from a plurality of collection devices associated with an operating area. An identifier, signal strength, collection device location, and date and time are recorded for the plurality of sensor spatiotemporal sighting events in a controlled memory data structure. A plurality of application events related to each sensor-host pair are collected and stored in the controlled memory data structure.

A behavioral model is constructed from the plurality of sensor spatiotemporal sighting events and the plurality of application events through operation of spatiotemporal tracking logic. Real time sighting events and real time application events are collected from the plurality of collection devices in the operating area. The events are compared to the behavioral model to identify inconsistent behavior from at least one sensor-host pair through operation of a behavior comparator. An alert may be generated if the inconsistent behavior is identified and communicating the alert to at least one collection device through operation of a notification controller.

In some configurations, the behavioral model identifies a spatiotemporal travel path by the sensor-host pair through the operating area.

In some configurations, the spatiotemporal tracking logic may utilize a machine learning algorithm in the construction of the behavioral model. The machine learning algorithm may be deep learning neural network is utilized to construct the behavioral model for at least one sensor-host pair utilizing the plurality of sensor spatiotemporal sighting events and the plurality of application events associated with the at least one sensor-host pair.

In some configurations, the behavior comparator may utilize a machine learning algorithm in the detection of the inconsistent behavior.

In some configurations, the method may collect the real time sighting events and the real time application events from the plurality of collection devices in the operating area for the at least one sensor-host pair in an event log. The system may then compare the event log to a spatiotemporal tracking rule set comprising trigger parameters for at least one rule set alert. The system may then generate a rule set alert for at least one sensor-host pair for a collection of events in the event log matching the trigger parameters. In some configurations, trigger parameters may be dependent on current date and time. The spatiotemporal tracking logic may utilize the rule set alerts in the construction of the behavioral model. The spatiotemporal tracking logic may utilize events logs to adjust the trigger parameters of the spatiotemporal tracking rule set.

A computing apparatus comprises a processor and memory storing instructions. When executed by the processor, the instructions configure the apparatus to define a sensor-host pairing and context metadata. The instructions may configure the apparatus to receive a plurality of sensor spatiotemporal sighting events of a sensor-host pair from a plurality of collection devices associated with an operating area. The instructions may configure the apparatus to record an identifier, signal strength, collection device location, and date and time for the plurality of sensor spatiotemporal sighting events in a controlled memory data structure. The instructions may configure the apparatus to collect a plurality of application events related to each sensor-host pair and storing the plurality of application events in the controlled memory data structure.

The instructions may configure the apparatus to construct a behavioral model from the plurality of sensor spatiotemporal sighting events and the plurality of application events through operation of spatiotemporal tracking logic. The instructions may configure the apparatus to collect real time sighting events and real time application events from the plurality of collection devices in the operating area and comparing them to the behavioral model to identify inconsistent behavior from at least one sensor-host pair through operation of a behavior comparator. The instructions may configure the apparatus to generate an alert if the inconsistent behavior is identified and communicate the alert to at least one collection device through operation of a notification controller.

In some configurations, the behavioral model identifies a spatiotemporal travel path by the sensor-host pair through the operating area.

In some configurations, the spatiotemporal tracking logic may utilize a machine learning algorithm in the construction of the behavioral model. The machine learning algorithm may be deep learning neural network is utilized to construct the behavioral model for at least one sensor-host pair utilizing the plurality of sensor spatiotemporal sighting events and the plurality of application events associated with the at least one sensor-host pair.

In some configurations, the behavior comparator may utilize a machine learning algorithm in the detection of the inconsistent behavior.

In some configurations, the instructions may configure the apparatus to collect the real time sighting events and the real time application events from the plurality of collection devices in the operating area for the at least one sensor-host pair in an event log. The system may then compare the event log to a spatiotemporal tracking rule set comprising trigger parameters for at least one rule set alert. The system may then generate a rule set alert for at least one sensor-host pair for a collection of events in the event log matching the trigger parameters. In some configurations, trigger parameters may be dependent on current date and time. The spatiotemporal tracking logic may utilize the rule set alerts in the construction of the behavioral model. The spatiotemporal tracking logic may utilize events logs to adjust the trigger parameters of the spatiotemporal tracking rule set.

The method assumes a host can be an animate or inanimate object. Starting with the example of a person paired with a sensor, a representative use case is within a work environment. The system assumes that periodic authentication occurs, validating the pairing of the sensor to its host. This may be via MFA or a human observation. For example, authentication may happen during the clocking-in or clocking-out from a job site.

As a worker proceeds to move in and out of the range of fixed or mobile collection devices (either because the host is moving or mobile collectors are moving, or both), they each log sightings of the sensors. As sightings are logged with the sensor's unique ID, event data is logged with the sighting data including the identity of the collection device, the person and/or department the collection device is assigned to, the location of the collection device using GPS or a fixed, known location ID, and a date and time stamp.

The collection of sightings together are interpreted by software and a host profile is developed. If the host is a person, there should be some consistency across a number of logged sightings:

1. The person may tend to clock-in (authenticate) and clock-out at certain times of the day, and at a certain location.
2. Sightings of the person's sensor may generally be logged by the same collectors during the day, or each day.
3. Sightings of sensors paired with other hosts may show a similar pattern if they report to the same boss, work with the same people, use the same tools or machines, ride in the same vehicle, or regularly work in the same building/room, etc.
4. A frequency rate of sightings typical for the host.

Figure 6:
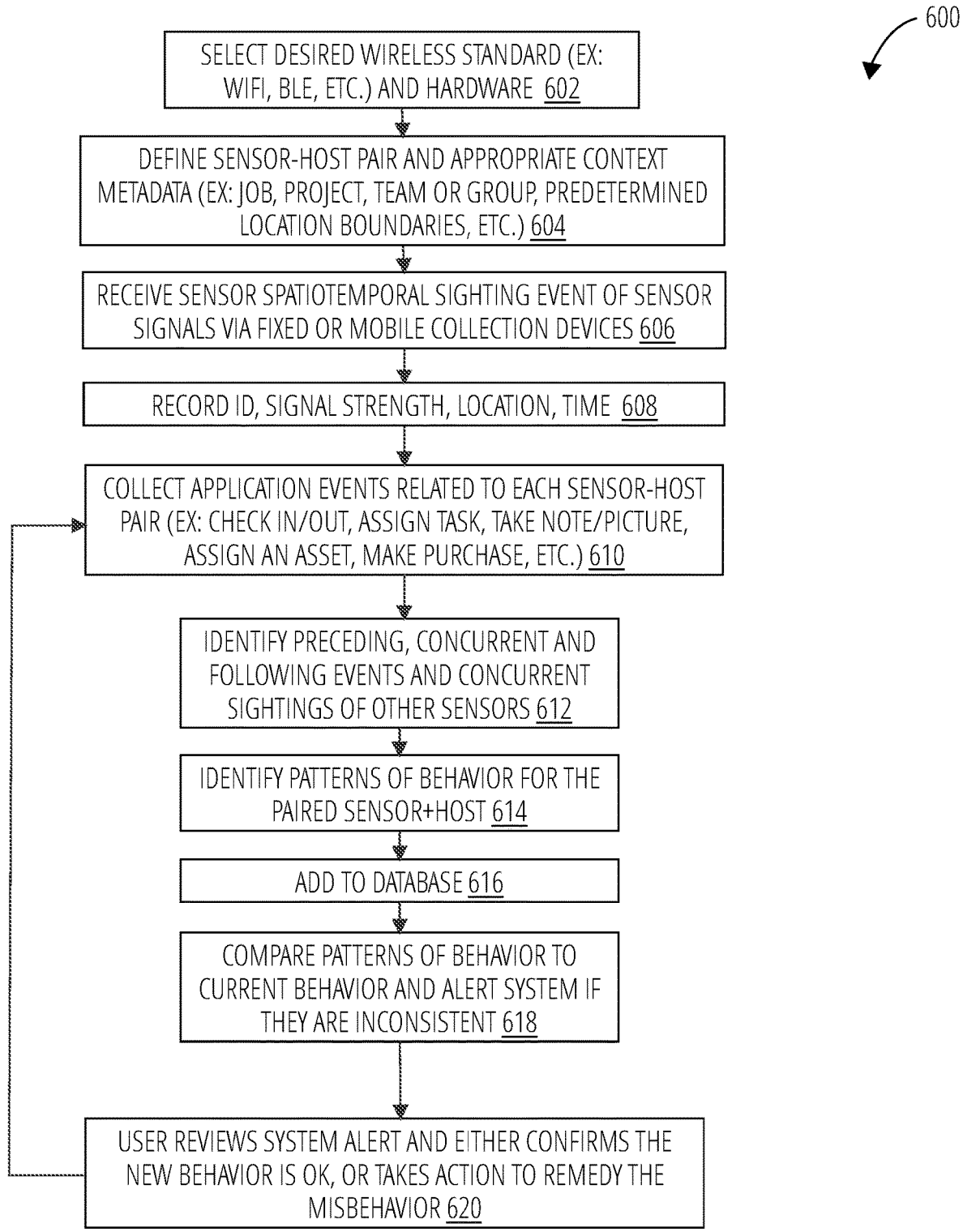
FIG. 6 illustrates a process 600 in accordance with one embodiment.

These and other factors are used by the method and system to feed Machine Learning technology. As illustrated in FIG. 6 (process 600), the system develops a behavioral profile of the paired sensor+host that can be used to alert the system when current behavior deviates from expected behavior. For example, the alert can prompt a supervisor to check that the employee still has their sensor, or that they get back to work if a break has lasted too long.

In some configurations, the machine learning algorithm may be utilized in determining the number of workers needed to efficiently complete a project as well as if are the individuals with correct skill sets are on a project in order to complete the project in a timely manner.

The machine learning system may also track bidding values associated with job contracts and compare it to the efficiency of previous projects with current labor forces to generate accurate bid prices for future contracts. The machine learning algorithm may also be implemented to determine what equipment should be on the job site based on historical data collected by the system.

FIG. 1 illustrates how the method may be combined with a system to continuously monitor and validate Host+Sensor pairing. This drawing depicts an example implementation as a field work environment where multiple wireless collection devices 106, 108, 110, 114, 116, and 120 are actively logging sightings of a sensor 126. It also depicts three instances (sensor spatiotemporal sighting event 128, sensor spatiotemporal sighting event 140, and sensor spatiotemporal sighting event 144) where multi-factor authentication is performed during the work day.

In the example workflow, the pairing of the worker 124 (Host) and a wireless sensor 126 is performed at a check-in area 104 where multi-factor authentication (MFA) can be performed. In some instances, the check-in area 104 may be geo-fenced and the wireless sensor 126 (e.g., Low Energy Bluetooth) may be paired to the host (worker 124) in the system.

In the check-in area 104 a check-in manager 148 operates a mobile collector 106 to perform the check-in of worker 124. In some instances, the most common collector may be a mobile phone and/or tablet so the wireless range may travel wherever they go on the job site. For this task, an application for authenticating the host (one or more MFA factors) and the sensor (another MFA factor) may be included.

There are various acceptable methods of MFA that may authenticate the pairing, including visible recognition by the check-in manager 148 of the sensor ID and the worker's photograph on the check-in device. Since a typical device would be a mobile phone or tablet, other options include fingerprint ID, facial recognition using the device's camera, and PIN entry. Any of these may reasonably authenticate the pairing. Once authenticated, the system logs a sensor spatiotemporal sighting event 128 on the check-in manager's collection device.

Following the initial check-in at sensor spatiotemporal sighting event 128 the worker 124 and the wireless sensor 126 (paired host+sensor) travel throughout the system environment 100. The system environment 100 tracks the paired host sensor along their path 130. A second sensor spatiotemporal sighting event (sensor spatiotemporal sighting event 132) in the system environment 100 is detected by supervisor 156's (Supervisor A) mobile collector 108 as the worker 124 travels through the wireless range 102 of the mobile collector 108 on their way to the work area 112 of supervisor 150 (Supervisor B). A sensor spatiotemporal sighting event 134 is the third sensor sighting event and occurs as the worker 124 enters the wireless range 102 of the supervisor 150's mobile collector 110 prior to the worker 124 and the wireless sensor 126 entering the work area 112. The sensor spatiotemporal sighting event 134 provides the system with information that assist in the identification of the path 130.

At sensor spatiotemporal sighting event 136 the worker 124 and the wireless sensor 126 are detected in the work area 112. The work area 112 includes multiple other workers 146 that each carry a wireless sensor that are periodically detected by the mobile collectors. The supervisor 150 confirms the sighting of the worker 124 on their mobile collector 110. As the worker 124 leaves the work area 112, multiple sensor sightings occur at a fifth sensor spatiotemporal sighting event (sensor spatiotemporal sighting event 138). One is made by supervisor 150's and supervisor 152's mobile collector. The worker 124 has exited supervisor 150's work area 112 but is still in wireless range 102. Another is made by supervisor 152's (Supervisor C) mobile collector 114 as the worker 124 crosses into its wireless range 102 while in route to the equipment/supplies area 118.

A sixth sensor spatiotemporal sighting event (sensor spatiotemporal sighting event 140) occurs at the equipment/supplies area 118, when the supplies manager 154 checks the wireless sensor 126 through their mobile collector 116. After the worker 124 finishes their activity at the equipment/supplies area 118, the worker 124 proceeds to the check-out area 122. During their travel to the check-out area 122, the worker 124 may be identified at sensor spatiotemporal sighting event 142. Sensor spatiotemporal sighting event 142 is a seventh sensor spatiotemporal sighting event, where multiple sensor sighting occur. At the sensor spatiotemporal sighting event 142, the worker 124 (host) has re-entered supervisor 150's (Supervisor B) work area 112 but is also in wireless range 102 of supervisor 152's (Supervisor C) mobile collector 114. The other sighting is made by supervisor 152's mobile collector 114. At sensor spatiotemporal sighting event 144, the worker 124 and the wireless sensor 126 enter the check-out area 122 and are checked out by the check-out manager 158 on their mobile collector 120.

Machine learning may recognize the time of day this host (worker) checks in every day.

A pathway through the job site is depicted by the dotted line. It helps illustrate how the method collects and validates continuous pairing of the host and the sensor.

As the host (worker) travels to their work area the host passes through the wireless range of supervisor A's mobile collector. This results in another sensor sighting. The method may utilize machine learning of this sighting on subsequent days to identify a pattern if this host regularly passes by supervisor A's work area en route to supervisor B's work area each day. As the host (worker) travels into supervisor B's wireless range, another sighting is logged. In some instances, the method may utilize machine learning to identify a pattern if this host regularly enters supervisor B's wireless range at a similar time each day.

Over the course of the day, multiple sightings may occur while the host (worker) performs work duties in supervisor B's work area. The method may utilize machine learning to identify the pattern of this host (worker) being affiliated with supervisor B during long periods of the day. The method may also utilize machine learning to identify the pattern of the host (worker) being sighted together with other hosts (workers) in supervisor B's work area during the day. Periodically, the host's (worker's) sensor may be sighted traveling to other parts of the job site. At the location depicted by the host (worker) is sighted twice within overlapping wireless ranges. Once by supervisor B's mobile collector, and once by supervisor C's mobile collector. The method may utilize machine learning to notice this as a potential exception where the host (worker) and sensor may no longer be paired. As the host (worker) travels into the Equipment/Supplies Area another sighting is logged. The illustration shows the host (worker) getting supplies or checking out a piece of equipment. The system re-authenticates the pairing of the host and sensor as the act of receiving the supplies/equipment is logged against the host (worker) who received them. The method utilizes machine learning to cancel the potential exception. As the host (worker) travels back to supervisor B's work area, a sighting is logged. At the end of the work day, the host (worker) travels to the check-out area and is re-authenticated by the check-out manager and the final sighting of the day is logged.

The system environment 200 illustrates a path through the job site for the worker 242. The worker 242 enters the check-in area 204 and is detected within the wireless range 206 a mobile collector 208. The check-in manager 262 checks the worker 242 and the wireless sensor 244 and the detection event is recorded as the first sensor spatiotemporal sighting event 260. The worker 242 then travels along path 202 where it is detected again within the wireless range 206 of the mobile collector 210 of supervisor 270 which records the sighting as sensor spatiotemporal sighting event 258.

Following sensor spatiotemporal sighting event 258, an event 228 may occur. Event 228 represents an instance when the worker 242 drops the wireless sensor 244 en route to supervisor 238's (Supervisor B) work area 218. Sometime later, worker 232 encounters the dropped sensor and picks it up. Worker 232 is not the host for this sensor because they have not been paired.

In this scenario, worker 232 enters work area at an alternate location 216 without checking in, encounters the wireless sensor 244 along their path 214 dropped by worker 242 and picks it up. After worker 232 enters supervisor 270's work area, the supervisor notices worker 232 and using the system, sees that worker 242's sensor is being sighted, but worker 232's sensor is not. Realizing that worker 242 is not nearby, supervisor 270 sends worker 232 to the check-in area 204 to get a unique sensor and to turn in worker 242's wireless sensor 244.

Supervisor 270 uses the System to alert other supervisors that worker 242 has misplaced their wireless sensor 244. The key outcome is to minimize the amount of time that worker 242 is separated from their sensor, and to reestablish an authenticated identity on the system.

At location 234, the worker 242 enters the wireless range 206 of the mobile collector 212 of the supervisor 238. Due to the fact that worker 242 dropped their wireless sensor 244, no sighting is made as the worker 242 enters supervisor 238's work area 218. The work area 218 includes other workers 250 that the mobile collector 212 periodically monitors.

At location 236, a sensor sighting would normally be observed by supervisor 238's mobile collector 212. However, the worker 242 has arrived in supervisor 238's work area mobile collector 212 without their wireless sensor 244.

The worker 242 checks in with supervisor 238 to get a work assignment. Supervisor 238 confirms that worker 242 is checked in and that their wireless sensor 244 is being seen by supervisor 238's mobile collector 212.

In some instances, the supervisor realizes that worker 242 doesn't have their sensor in their possession and issues the worker 242 a new wireless sensor. The old wireless sensor 244, if later found, may be assigned to a new worker in the future. Data captured by the old wireless sensor 244 may be attributed to the correct worker based on timestamps.

At event 240, the worker 242 may be instructed by the supervisor 238 to travel along path 254 to recover their wireless sensor 244. Because supervisor 270's mobile collector 210 registered the last sighting (sensor spatiotemporal sighting event 258), supervisor 238 may use the system to determine this fact and instruct worker 242 to check the area in supervisor 270's wireless range 206. Once worker 242 returns with their wireless sensor 244 (now the pairing of the host and sensor is reestablished), the worker may continue working and is now being properly tracked by the system.

In the case where supervisor 238 does not realize worker 242 is without their wireless sensor 244, another location on the job site may detect it. For example, on a trip to the equipment/supplies area 224, the worker 242 will have to use their wireless sensor 244 to check out equipment or supplies. Since no sensor sighting is made initially at location 248 when the worker 242 attempts to check out a piece of equipment or supplies, worker 242 will be unable to present their wireless sensor 244. The supplies manager 268 may use the system to determine the last sighting of the wireless sensor 244 occurred in supervisor 270's wireless range 206 and send the worker to find it along path 256. Once the worker 242 returns with their wireless sensor 244 (now the pairing of the host and sensor is reestablished), the worker 242 is able to check out the equipment or supplies and return to their work area. The equipment/supplies area 224 may be geo-fenced but not necessarily. The mobile collector 222 for the supplies manager 268 may be a mobile phone or tablet so the wireless range will travel wherever they go on the job site. For this task, an application for re-authenticating the host (one or more MFA factors) and the sensor (another MFA factor) will be included as part of the process of checking in/out equipment or supplies.

At location 252, the worker 242 returns to supervisor 238's work area 218 and sightings by supervisor 238's mobile collector 212 and supervisor 266's mobile collector 220 are made identifying that the worker 242 is being properly tracked by the system.

Sensor spatiotemporal sighting event 246 is made by the check-out manager 264's mobile collector 226 within the check-out area 230 indicating that the worker 242 is about to check out of the system.

The mobile collector 226 for the check-out manager 264 may be a mobile phone or tablet to allow the wireless range to travel wherever they go on the job site. For this task, an application for authenticating the host (one or more MFA factors) and the sensor (another MFA factor) may be included. The check-out area 230 may be geo-fenced, but not necessarily.

Figure 2:
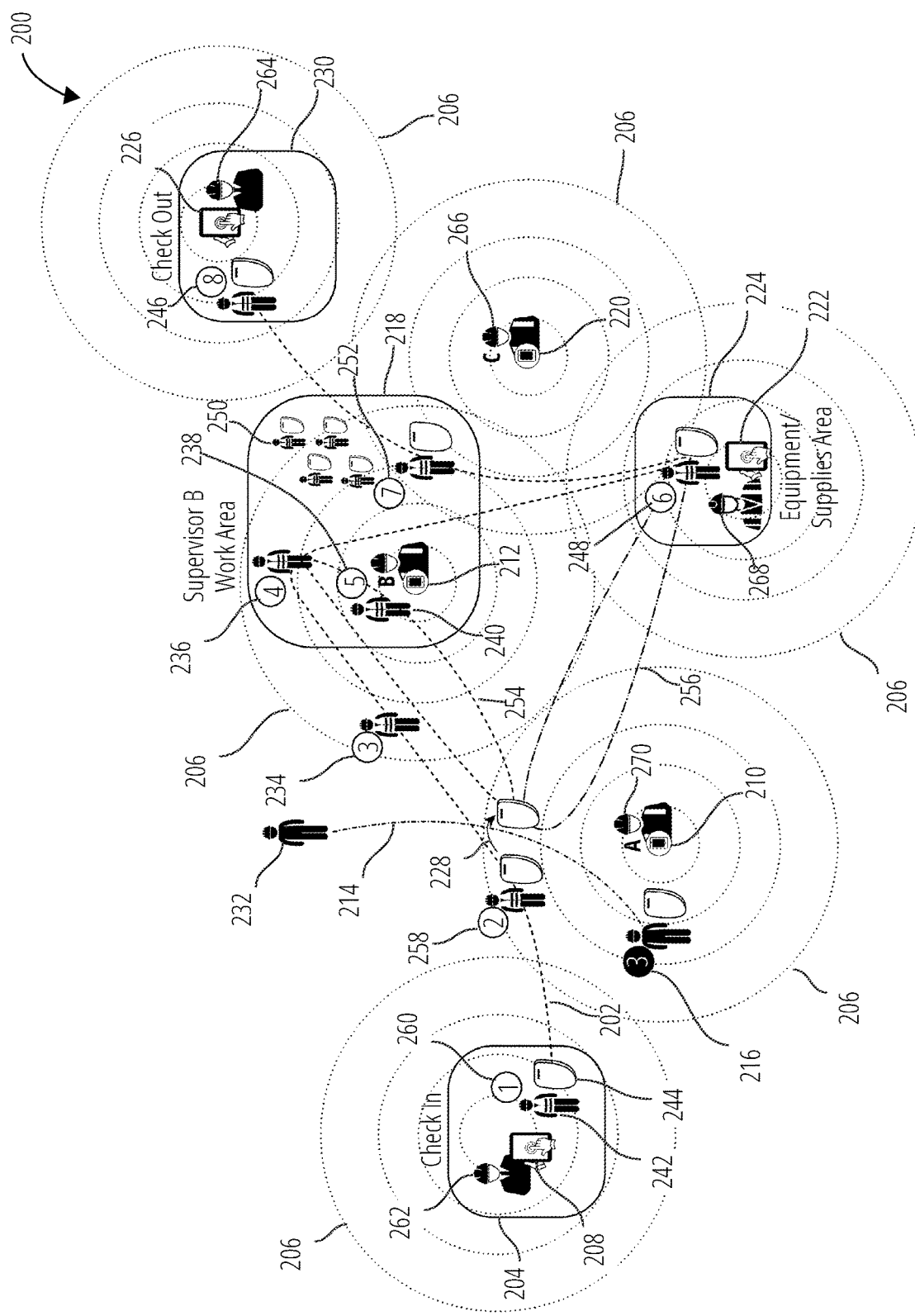
FIG. 2 illustrates a system environment 200 in accordance with one embodiment.

FIG. 2 expands on FIG. 1 to illustrate how the method may be combined with a system to continuously monitor and validate host+Sensor pairing. This drawing depicts an example implementation as a field work environment where the host (worker) and paired sensor have become separated on the job site. After checking in, the host walks a path towards supervisor 238's Work Area. En-route, the host drops their sensor within supervisor 270's wireless range. Proceeding to supervisor 238's Work Area, the worker begins performing their duties.

This drawing offers three examples of how the method and system together serve to re-pair the host and their sensor.

In example 1, supervisor 238 intervenes to re-pair the host and sensor. Supervisor 238 becomes aware that worker 242 and their sensor have become separated. The system may employ the method, leveraging the machine learning and artificial intelligence to detect an unusual condition. This may be fed by the historical work patterns of worker 242 and the system's awareness that worker 242 checked in, but hasn't been seen in in supervisor 238's work area. The system in that case may prompt supervisor 238 about the out-of-the-ordinary condition.

If the supervisor has already noticed worker 242 on site, this may trigger the supervisor to ask the worker where their sensor is. If the supervisor hasn't seen worker 242 but expects them to be on the job, the system may show that the sensor was last seen by supervisor 270's mobile collector. Supervisor 238 may call supervisor 270 and ask if the worker located near him/her. Of course, supervisor 270 may not see the worker, so supervisor 238 may naturally begin asking other workers in supervisor 238's work area whether they have seen worker 242. Since worker 242 is actually on the job in that work area, the two may locate each other and realize worker 242 dropped their sensor. Supervisor 238 may ask the worker to retrace their steps into supervisor 270's wireless range, where the sensor was last sighted by the system. Once located, worker 242 returns to the job.

In the second example, if supervisor 238 does not intercede right away, the drawing illustrates that worker 242 may travel into another area that requires use of their sensor. In the drawing, the equipment/supplies area illustrates this use case. When the worker attempts to check out a piece of equipment or supplies, the manager in charge of that area may expect to confirm the check-out with the worker's sensor. Since the sensor may not be read (it is outside of the manager's wireless range), the worker may become aware that they dropped their sensor. The manager may use the system to tell the worker when and where the dropped sensor was last sighted by the system. The drawing illustrates worker 242 walking back to the dropped sensor's location within supervisor 270's wireless range to retrieve and re-pair the host and sensor.

In the last example, another worker (worker 232), walking a path toward supervisor 270, encounters the dropped sensor on the ground. This worker might present the lost sensor to supervisor 270 or walk it back to the check-in area. In either of these cases, supervisor 238 would be contacted to confirm worker 242's presence, and worker 242 would likely be asked to go retrieve the sensor.

In this illustration, worker 232 has not checked in, and by picking up worker 242's sensor, would appear in the system on supervisor 270's mobile collector as worker 242. Since the system includes a photograph of each host (worker) paired with the sensor ID, supervisor 270 may be able to reject the authentication between worker 232 and the sensor. This would typically result in supervisor 270 telling worker 232 to return to the check-in area, return worker 242's sensor to the check-in manager, and then properly check themselves in with their own sensor.

Figure 3:
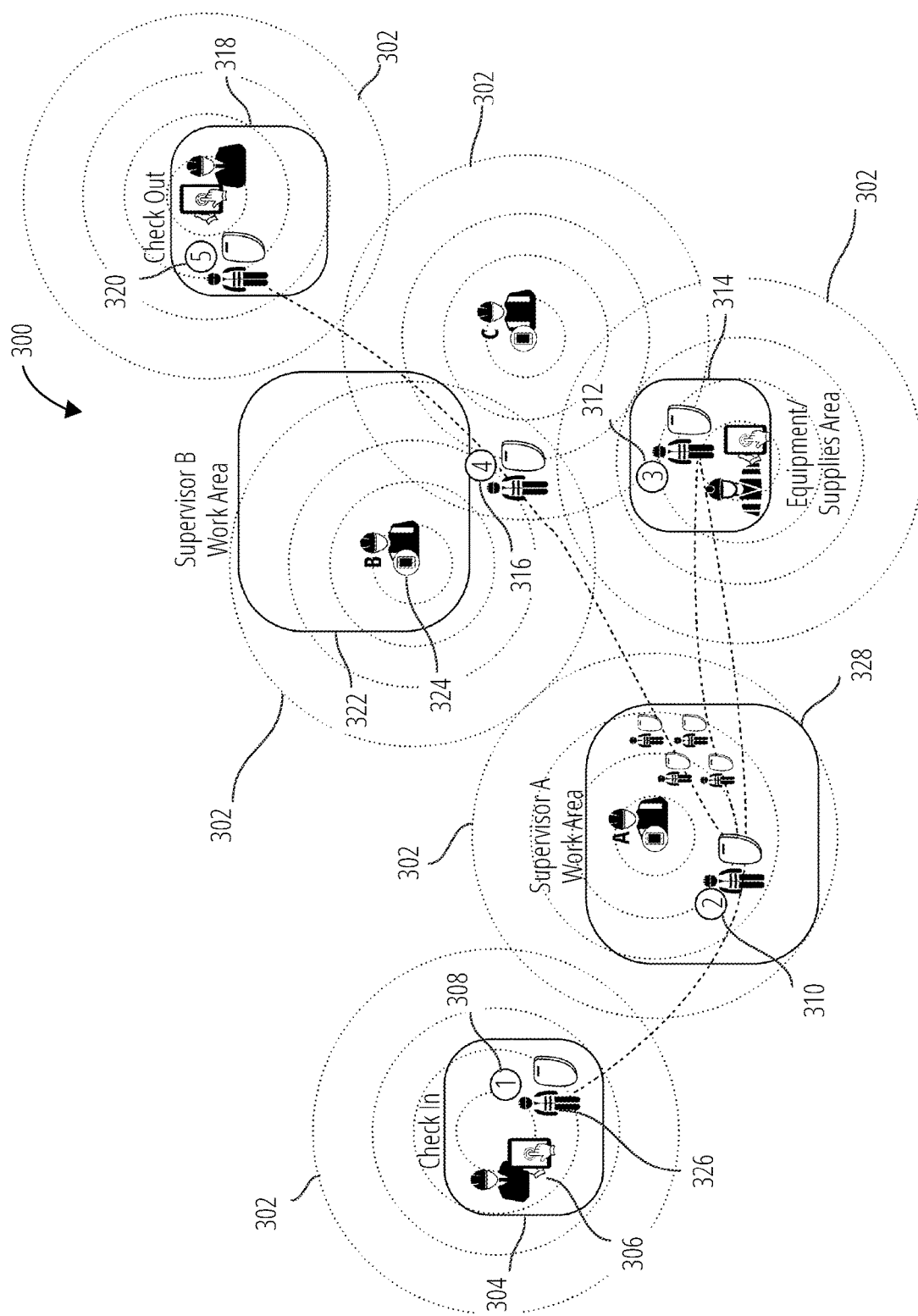
FIG. 3 illustrates a system environment 300 in accordance with one embodiment.

In FIG. 3, the system environment 300 illustrates a sensor spatiotemporal sighting event 308 of the wireless sensor and worker 326 when the worker 326 checks in at check-in area 304 through the check-in manager's wireless collector 306 within its wireless range 302. At sensor spatiotemporal sighting event 310, the worker 326 is spotted in work area 328. At sensor spatiotemporal sighting event 312, the worker 326 travels to the equipment/supplies area 314 and then returns to work area 328. At sensor spatiotemporal sighting event 316, the worker 326 is spotted within the wireless range 302 of the mobile collector 324 associated with work area 322. At sensor spatiotemporal sighting event 320 the worker 326 enters the check out area 318 to leave for the day.

FIG. 3 expands on FIG. 1 and FIG. 2 to illustrate how the method can be combined with a system to use machine learning to recognize a new pattern due to worker 326's new work assignment.

In this example, after several days working in Supervisor B's work area 322, worker 326 clocks in sensor spatiotemporal sighting event 308 at the check-in area 304. Learning of a new assignment on their mobile wireless collector 306 (e.g., electronic tablet), the Check-in Manager informs the worker to report to Supervisor A's work area 328. The system may or may not be aware of this new assignment. For the purposes of this example, it is assumed the system is not aware.

Worker 326 travels to Supervisor A's work area 328 and begins working. Since the system recognizes the location of the worker and collects multiple sensor sightings over time, its machine learning methods become aware that the worker is not at his/her usual location.

To verify the identity of worker 326, the sensor pairing, and that the work location is correct, the system prompts the wireless collector of Supervisor A (which is closest to worker 326) with a request to confirm that this worker is present and in the correct location. If the system does not get a response, it will prompt the former supervisor, Supervisor B, on their mobile collector 324 with a message that the system has noticed that worker 326 has not been sighted by the system in Supervisor B's work area 322, and to either confirm that the worker has been reassigned to Supervisor A, or that the worker and their sensor have become separated (as illustrated in FIG. 2).

A system response by either supervisor provides useful feedback to the machine learning engine and will help validate that the worker has been reassigned. As sightings by the mobile collector in Supervisor A's work area 328 add up for worker 326, the system's confidence in the appropriateness of this new work location grows. This confidence level is key to continuous validation of the identity of worker 326.

Figure 4:
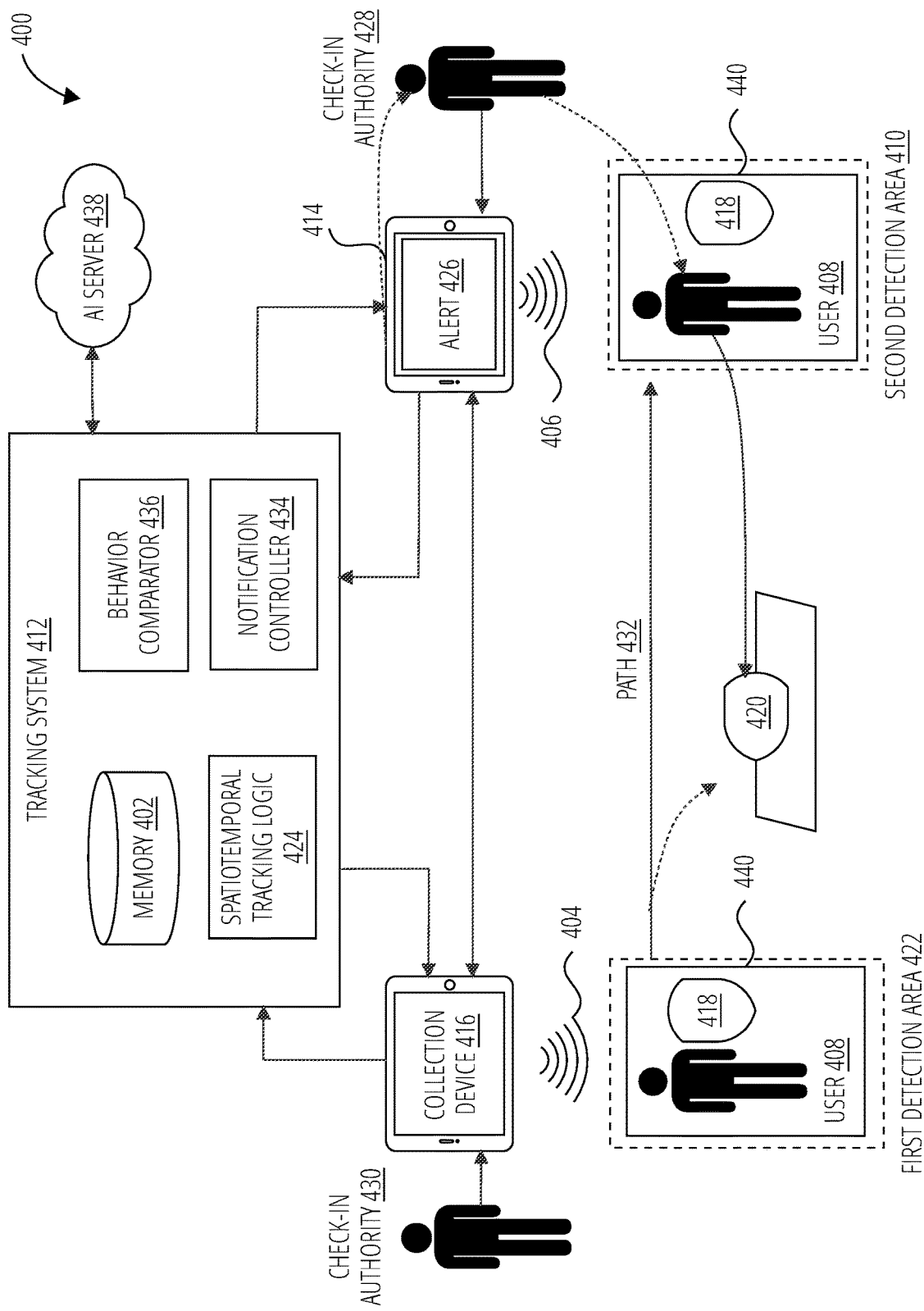
FIG. 4 illustrates a system 400 in accordance with one embodiment.

Referencing FIG. 4, a system 400 for continuously validating and authenticating host and sensor pairs comprises a collection device 416, a first detection area 422, a collection device 414, a second detection area 410, a beacon 418, a tracking system 412, and a machine learning algorithm 438. The tracking system 412 comprises spatiotemporal tracking logic 424, a behavior comparator 436, a notification controller 434, and controlled memory data structure 402. In the system 400, a sensor-host pair 440, (user 408 and beacon 418) are detected by a collection device 416 at the first detection area 422 through the sensor field 404 of the collection device 416. The collection device 416 communicates the detection of the beacon 418 to the tracking system 412 and receives pairing information about the sensor-host pair 440. A check-in authority 430 operating the collection device 416 validates the pairing information with the sensor-host pair 440.

The sensor-host pair 440 moves from the first detection area 422 to the second detection area 410 along a spatiotemporal travel path 432. At the second detection area 410, the sensor field 406 of collection device 414 detects the sensor-host pair 440 and communicates the information to the tracking system 412. The spatiotemporal tracking logic 424 identifies previous detection events stored in the controlled memory data structure 402 to determine the spatiotemporal travel path 432 of the sensor-host pair 440. The spatiotemporal travel path 432 is then compared to previous paths stored in the controlled memory data structure 402 by the behavior comparator 436. If the behavior comparator 436 detects that the spatiotemporal travel path 432 between first detection area 422 and the second detection area 410 deviates from previous paths and/or expected paths, the notification controller 434 communicates an alert 426 to the collection device 414.

The check-in authority 428 may then ask the user 408 why the spatiotemporal travel path 432 was different in the past. In some instances the user 408 may lose their beacon while traveling between detection areas. In these situations, the collection device 414 may communicate an alert 426 to the check-in authority 428 that the user 408 does not have the beacon 420 with them. The check-in authority 428 may then notify the user 408 that they lost their beacon 420 along the way from the first detection area 422.

In some configurations, the tracking system 412 communicates with a machine learning algorithm 438. The machine learning algorithm 438 may utilize the information stored in memory to improve the detection parameters of the behavior comparator 436. In some instances, the collection device 416 may be able to communicate detection event information to the collection device 414 when the devices are nearby. The system 400 may be operated in accordance with the process described in FIG. 5 and FIG. 6.

Figure 5:
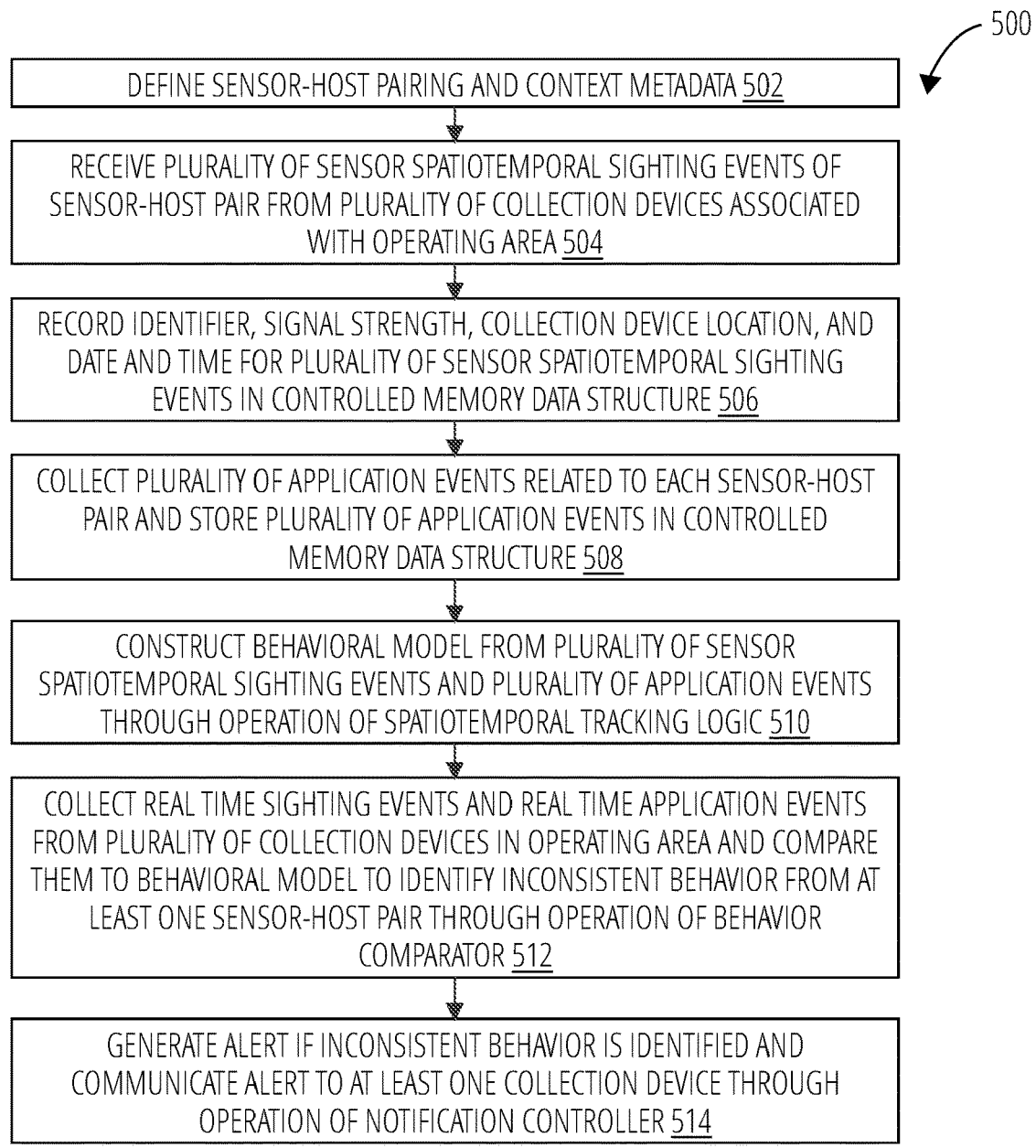
FIG. 5 illustrates a method 500 in accordance with one embodiment.

FIG. 5 illustrates a method 500 for continuously validating and authenticating host and sensor pairs. The method 500 involves defining a sensor-host pairing and context metadata (block 502). In block 504, the method 500 receives a plurality of sensor spatiotemporal sighting events of a sensor-host pair from a plurality of collection devices associated with an operating area. In block 506, the method 500 records an identifier, signal strength, collection device location, and date and time for the plurality of sensor spatiotemporal sighting events in a controlled memory data structure. In block 508, the method 500 collects a plurality of application events related to each sensor-host pair and stores the plurality of application events in the controlled memory data structure.

In block 510, the method 500 constructs a behavioral model from the plurality of sensor spatiotemporal sighting events and the plurality of application events through operation of spatiotemporal tracking logic. In block 512, the method 500 collects real time sighting events and real time application events from the plurality of collection devices in the operating area and compares them to the behavioral model to identify inconsistent behavior from at least one sensor-host pair through operation of a behavior comparator. In block 514, the method 500 generates an alert if the inconsistent behavior is identified and communicates the alert to at least one collection device through operation of a notification controller.

In FIG. 6, a process 600 is describes implementation of the method 500 for continuously validating and authenticating a host and sensor pair. In block 602, the process 600 selects a desired wireless standard (ex: WiFi, BLE, etc.) and hardware components (block 602). In block 604, the process 600 may define a sensor+host pairing and the appropriate context metadata (ex: job, project, team or group, predetermined location boundaries, etc.) for tracking behavior. In block 606, the process 600 receives sighting events of sensor signals via fixed or mobile collection devices operated by the check-in authority (check-in manager). In block 608, the process 600 records the beacon ID associated with the sensor-host pair, signal strength, location, and time during the detection event. In block 610, the process 600 collects application events related to each sensor-host pair (ex: check in/out, assign task, take note/picture, assign an asset, make purchase, etc.). In block 612, the process 600 identifies preceding, concurrent and following events and concurrent sightings of other sensors. In block 614, the process 600 identifies patterns of behavior for the paired sensor+host through operation of the behavior comparator. In block 616, the process 600 adds the identified behavior pattern into the database. In block 618, the process 600 compares patterns of behavior to current behavior and operates a notification controller if they are inconsistent. In block 620, the process 600 prompts a user to review the system alert and either confirm the new behavior is OK or take action to remedy the misbehavior. Additionally, in the block 620, the process 600 then recursively returns to block 610 to receive information about the sensor-host pair. In some configurations, the process 600 may utilize a hidden Markov model, clustering, and deep neural networks to aide in the identifications of behavior patterns.

Figure 7:
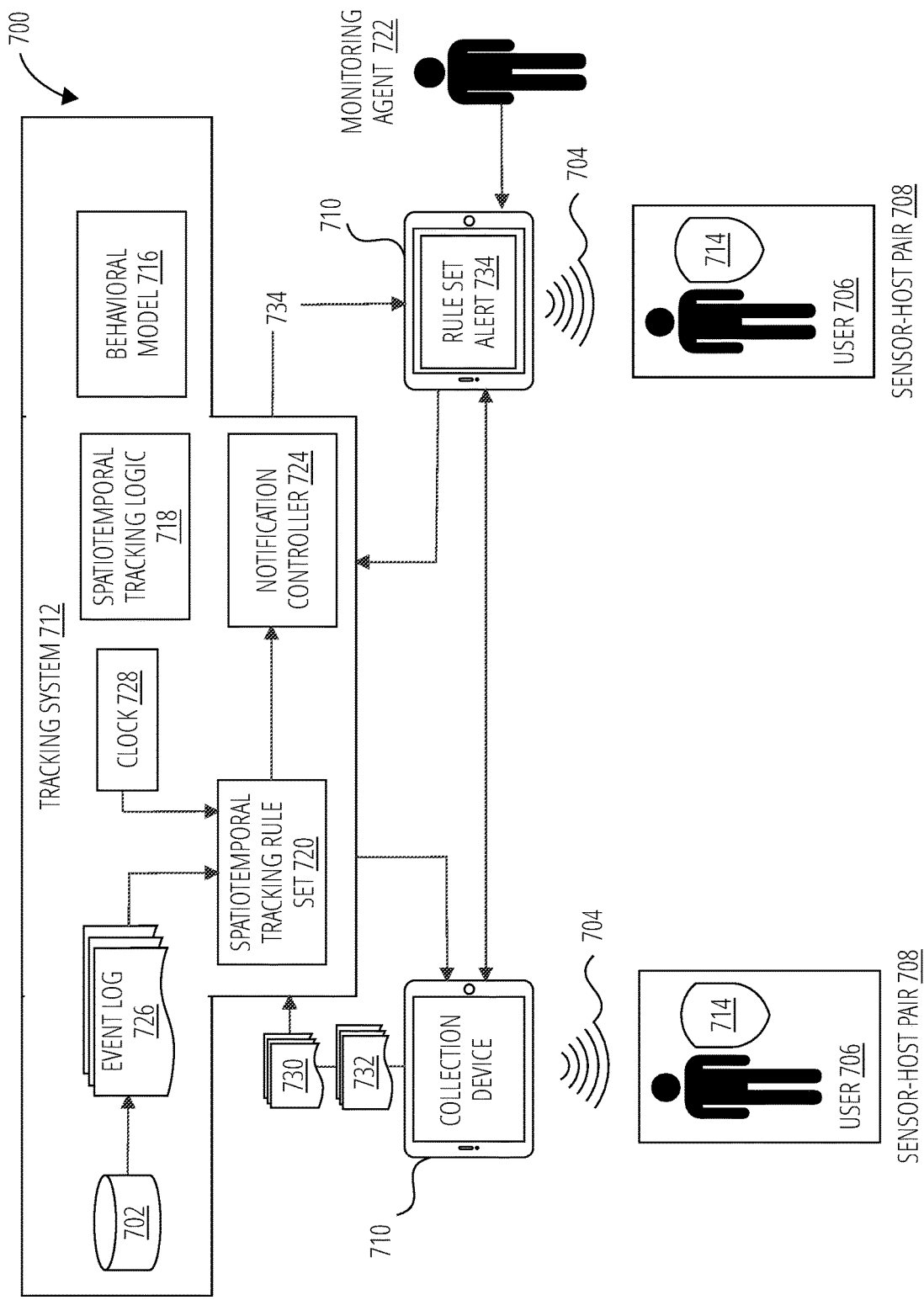
FIG. 7 illustrates a system 700 in accordance with one embodiment.

FIG. 7 illustrates a system 700 for continuously validating and authenticating host and sensor pairs. The system 700 comprises a tracking system 712, and plurality of collection devices 710. The plurality of collection devices 710 emit a sensor field 704 for detecting a sensor-host pair 708 through a user 706's beacon 714. The plurality of collection devices 710 record the detection of the sensor-host pair 708 as real time sighting events 730 and real time application events 732 that are communicated to the tracking system 712. The tracking system 712 comprises a controlled memory data structure 702, a spatiotemporal tracking rule set 720, a clock 728, a spatiotemporal tracking logic 718, a notification controller 724, and a behavioral model 716. The tracking system 712 collects the real time sighting events 730 and the real time application events 732 through the plurality of collection devices 710 within an operating area.

The real time sighting events 730 and the real time application events 732 are collected in an event log 726 that may be stored within the controlled memory data structure 702. The tracking system 712 compares the event log 726 against a spatiotemporal tracking rule set 720 and the clock 728 to determine if a collection or series of events in the event log 726 match trigger parameters for generating a rule set alert. If a match is found, a rule set alert 734 is communicated to at least one collection device of the plurality of collection devices 710 by the notification controller 724 to notify a monitoring agent 722. The system 700 may be operated in accordance with the process described in FIG. 8

Figure 8:
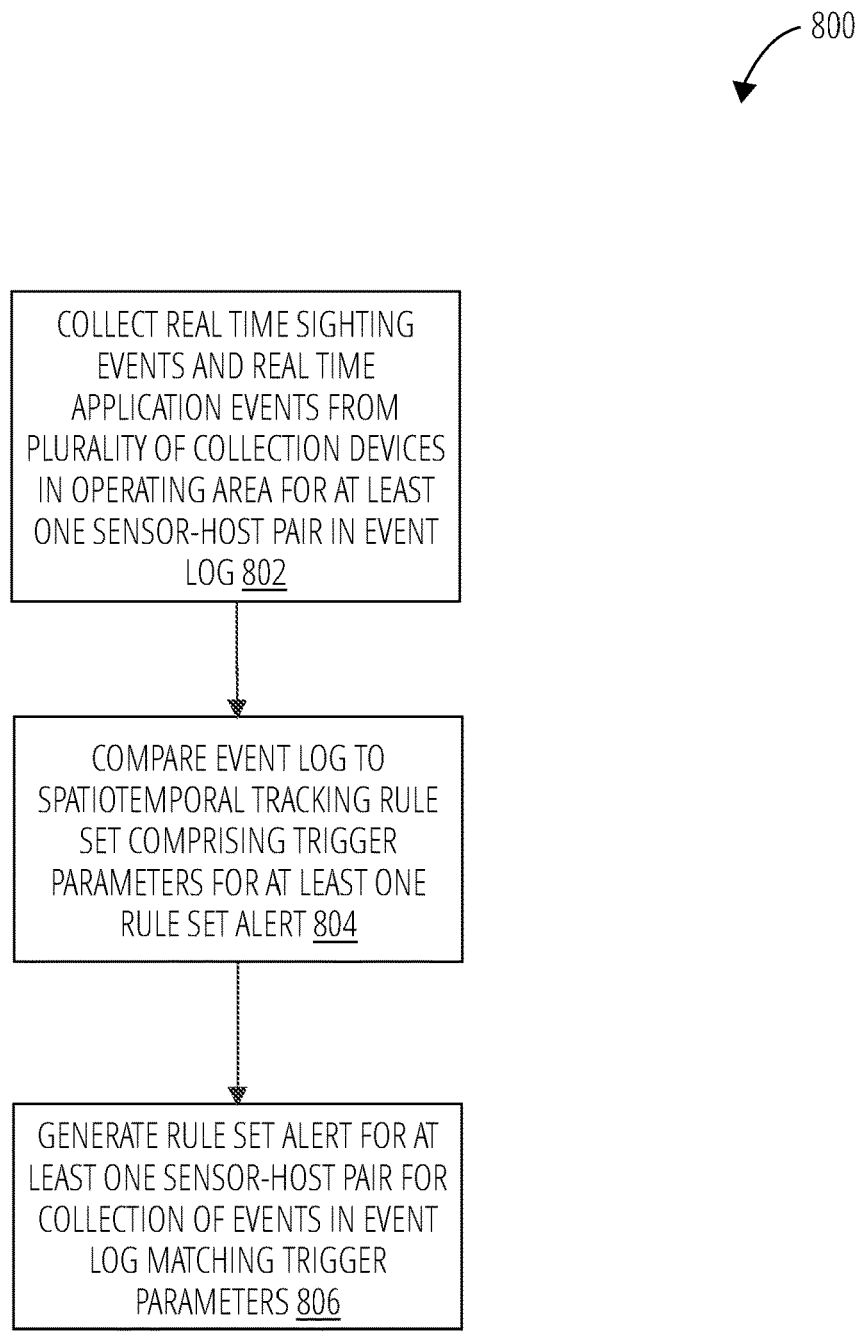
FIG. 8 illustrates a method 800 in accordance with one embodiment.

FIG. 8 illustrates a method 800 for continuously validating and authenticating host and sensor pairs. In block 802, the method 800 collects the real time sighting events and the real time application events from the plurality of collection devices in the operating area for the at least one sensor-host pair in an event log. In block 804, the method 800 compares the event log to a spatiotemporal tracking rule set comprising trigger parameters for at least one rule set alert. In block 806, the method 800 generates a rule set alert for at least one sensor-host pair for a collection of events in the event log matching the trigger parameters.

TABLE 1

Sample Daily Notifications

| Exception Severity f(t) | Information Severity f(t) | Example | Type |
| --- | --- | --- | --- |
| t >= 4 hr | t = 2 hr | A worker has not been seen on the "Proj_1" project. | WorkerDark |
| t >= 2 hr | t = 1 hr | A worker has not checked into the "Proj_1" project. | WorkerNoCheckin |
| t >= 2 hr | t = 1 hr | 7 workers have not checked into the "Proj_2" project. | WorkerNoCheckin |
| t >= 2 hr | t = 1 hr | A worker has not checked out of the "Proj_2" project. | WorkerNoCheckout |
| t >= 1 hr | | You appear to be observing workers from the "Proj_2" project but you have not checked into the project. | CollectorNoCheckin |
| | t = 1 hr | 10 workers have been checked into the "Proj_1" project for over 9 hrs. | WorkerOvertime |
| | t = 4 hr | We've noticed you are no longer observing workers on the "Proj_2" project. Are you still there? | CollectorIdle |
| | t = 1 hr | A hail storm is predicated to occur near the "Proj_1" project in 4 hrs. | InclementWeather |
| t >= 1 hr | | You appear to be observing workers from the "Proj_2" project but they are checked into a different project. | CollectorProjectMismatch |
| t >= 1 hr | | You appear to be observing equipment from the "Proj_4" project but you have not checked into the project. | CollectorProjectMismatch |
| t >= 4 hr | t = 2 hr | A fan on the "Proj_4" project has not been observed. | EquipmentIdle |
| t >= 4 hr | t = 2 hr | 5 fans on the "Proj_2" project have not been observed. | EquipmentIdle |
| t >= 4 hr | t = 2 hr | A fan has not checked into the "Proj_2" project. | EquipmentNoCheckin |
| t >= 1 hr | | You appear to be observing equipment from the "Proj_3" project by you have not checked into the project. | CollectorProjectMismatch |

Table 1 illustrates a sample of the notifications that may be generated throughout a day of operation by the system from at least one job site. The notifications may include the type of notification, a description of the event, and the severity window of the event.

TABLE 2

Processing Rules for Notifications

| ①Exception Trigger | ②Information Trigger | Category | Type |
|---|---|---|---|
| Now >= (LST + 4 hr) && CIE != null | Now >= (LST + 2 hr) && Now < (LST + 2 hr + Buffer) && CIE != null<br>t1------------------------t2---x---------<br>t1-t2 is the theoretical info window t2-x is a buffer window at end of t2 | Worker | WorkerDark |
| (Now − 2 hr) > LST && CIE = null | (Now − 1 hr) > LST && CIE = null | Worker | WorkerNoCheckin |
| (Now − LST) >=4 && CIT >= 9 hr && CO == null | (Now − LST) >=2 && CIT >= 9 hr && CO == null | Worker | WorkerNoCheckout |
| (Now − 1 hr) > LST && CIE = null | n/a | Collector | CollectorNoProjectCheckin |
| n/a | (Now − LST) <= 1 && CIT > 8 hr && CO == null | Worker | WorkerOvertime |
| n/a | (Now − 4 hr) > LCE | Collector | CollectorDark |
| n/a | (Now + 1 hr) = LWE where bad weather is . . . | Misc | InclementWeather |
| (Now − 1 hr) > LST && CIE != Current Project | n/a | Collector | CollectorProjectMismatch |
| (Now − 4 hr) > LST | (Now − 2 hr) > LST && CIE != null | Equipment | EquipmentDark |
| (Now − 2 hr) > LST && CIE = null | (Now − 2 hr) > LST && CIE = null | Equipment | EquipmentNoCheckin |
| (Now − 1 hr) > LST && CIE != Current Project | n/a | Equipment | CollectorProjectMismatch |

In Table 2, an example rule set is shown for exception and information triggers for some alert categories and types. The rules may utilize the time values of specific events and configured time windows in combination with the current time and date to determine whether an alert is generated and what type of alert is generated. A shorthand notation is utilized to represent some events in Table 2. These include a last sighting event (LST), a last collector event (LCT), a check-in event (CIE), check-in time (CIT), a checkout event (COE), and a last weather event (LWE).

checkout events may be recorded with a status and time stamp indicating at least the occurrence of the event. The processing of a time stamp for check-in (CIT) and checkout events may depend on at least the rule type and other recorded events such as a check-in event or last sighting time.

In an ASCII event window the rules may appear as described bellow.

[Information Trigger] Dark worker: A worker sighing was made at 6 but not seen for 2 hours where n=now and b=buffer
' - - - 6 - - - n - - - 8 - - - b - - - 12 - - -

TABLE 3

Processing Rule Examples

| Project | Now | LST | LCE | CIE | COE | Info (t) | Ex (t) | Info Trigger | Exception Trigger | Type |
|---|---|---|---|---|---|---|---|---|---|---|
| Proj_1 | 10:00 | 8:00 | | ⊘ | | 2 hr + 5m | 4 hr | 10 >= 10 && 10 <=10:05 | | WorkerDark |
| Proj_1 | 13:00 | 8:00 | | ⊘ | | 2 hr + 5m | 4 hr | | 13 >= 12:00 | WorkerDark |
| Proj_2 | 10:00 | 8:30 | | △ | | 1 hr | 2 hr | 9 >= 8:30 | | WorkerNoCheckin |
| Proj_2 | 11:00 | 8:30 | | △ | | 1 hr | 2 hr | | 9 >= 8:30 | WorkerNoCheckin |
| Proj_2 | 17:00 | 15:00 | | ⊘ 06:00 | △ | 2 hr | 4 hr | 17 −15:00 >=2 && CIT >= 9 (11) | | WorkerNoCheckout |
| Proj_2 | 19:00 | 15:00 | | ⊘ 06:00 | △ | 2 hr | 4 hr | | 19 − 15:00 >=4 && CIT >= 9 hr (13) | WorkerNoCheckout |
| Proj_3 | 15:00 | | 11:00 | ⊘ | | 4 hr | n/a | 4 >= 4 | | CollectorIdleEvent |
| Proj_2 | 10:00 | 7:30 | 07:30 | △ | | n/a | 1 | | 1.5 >=1 | CollectorProjMismatch |
| Proj_3 | 18:30 | 17:45 | | ⊘ 07:00 | | >8 hr | n/a | 18:30 − 17:45 < 1 && CIT > 9 (9.75) | | WorkerOvertime |

Table 3 illustrates the rule processing for different types of alerts as well as their severity. The processing tracks the current date and time (NOW), the last collector event (LCE), check-in event (CIE), check-in time (CIT), checkout event (COE) for at least each project and worker. Each alert type includes and information and exception trigger window [info(t), Ex(t)], that is utilized to calculate the information and/or exception trigger times. The check-in events and

[Exception Trigger] Dark worker: A worker sighting was made at 6 but not seen over 4 hours where n=now ' - - - 6 - - - 8 - - - 10 - - - n - - -

[Information Trigger] No checkout: A worker has not been seen for 2 hours and has been checked in for over 9 hours ' - - - 6 - - - ci - - - 10 - - - s - - - 14 - - - n - - - 18 - - - 22 - - -

TABLE 4

C# Rule Definition Syntax
Parameterized Tokens

| Name | Type | Scope | Description |
|---|---|---|---|
| FN | Volatile | Worker | Collector | First name |
| LN | Volatile | Worker | Collector | Last name |
| PN | Volatile | Worker | Collector | Project name |
| TN | Volatile | Worker | Collector | Trade name |
| SN | Volatile | Worker | Sensor name |
| DN | Volatile | | Collector | Device name |
| LST | Volatile | Worker | Collector | Last sighting time |
| LCT | Volatile | Worker | Collector | Last checkin time |

Table 4 shows an example of parameterized tokens that may be utilized by the system for processing different rules when implemented in C# programming language. The parameterized tokens have a scope relating their use with workers and collectors.

TABLE 5

Rule Syntax Examples

| Category | Type | C# Syntax | Example |
|---|---|---|---|
| Worker | ⓒ⊗ WorkerDark | string.format("{0} {1} has not been observed on project {2} since {3}", {{FN}},{{LN}},{{PN}},{{LST}}) string.format("ALERT: {0} {1} has not been observed on project {2} since {3}", {{FN}},{{LN}},{{PN}},{{LST}}) | ⓒ Joe Smith has not been observed on project_site_1 since 6/8/2018, 6:39 PM ⊗ ALERT: Joe Smith has not been observed on project project_site_1 since 6/8/2018, 6:39 PM |
| Worker | ⓒ⊗ WorkerNoCheckin | | ⓒ Joe Smith has beenobserved onsite but is not checked in. Please investigate. ⊗ ALERT: Joe Smith has been onsite for 4 hours and has not checked in. |
| Worker | ⓒ⊗ WorkerOvertime | | ⓒ Joe Smith has started to accrue overtime for the day. ⊗ Joe Smith has worked 4 hours of overtime for the day. Please verify. |

Table 5 illustrates examples of the C# syntax that may be utilized for generating different events that includes the parameterized tokens.

TABLE 6

Parameterized Event Tokens

| Name | Type | Scope | Factory Threshold Value | Description |
|---|---|---|---|---|
| LST | Volatile | Worker | n/a | Last sighting time |
| PCI | Volatile | Worker| Collector | n/a | Project checkin flag |
| ITW | Static | Worker| Collector | 1 hr 00 min | Information trigger window: Time in minutes when we raise an information alert |
| ETW | Static | Worker| Collector | 4 hr 00 min | Exception trigger window: Time in minutes when we raise an exception alert |
| EWP | Static | Worker| Collector | 0 hr 5 min | End window trigger padding: Padding in minutes added to the end of an ITW or ETW window |
| PCIM | Volatile | Worker | n/a | Project checkin time minutes |
| OTT | Static | Worker | 8 hr 30 m | Labor time threshold of when a worker enters an OT state (mins) |
| LCT | Volatile | Worker| Collector | n/a | Last checkin time |
| MCI | Volatile | Collector | n/a | Last mobile collection time |

Table 6 illustrates parameterized events tokens utilized in the processing of different alert rules. These event tokens include a scope indicating if the token is utilized in the tracking of a worker, collector, or both. The parameterized event tokens are utilized in the example rules shown in Tables 7-14 showing a sample implementation of the rules as they would appear in C#.

TABLE 7

| Rule Type | C# Syntax |
|---|---|
| [Information Trigger] ⓒ WorkerDark | @ "DateTime.UtcNow > DateTime.Parse(" "{{LST}}" ").ToUniversalTime( ).Add(TimeSpan.FromMinutes({{ITW}})) && DateTime.UtcNow < DateTime.Parse(" "{{LST}}" ").ToUniversalTime( ).Add(TimeSpan.FromMinutes({{ITW}} + {{EWP}}))" |

Referencing Table 7, the C# Syntax above corresponds to an information trigger for generating an information alert based, in part, on when a worker was last sighted on the project. To generate the information alert, a theoretical trigger window (TTW) is calculated from the sum of the last sighting time (LST) for the worker and the value for the information trigger window (ITW). A padded theoretical trigger window (PTTW) is calculated from the last sighting time (LST) and the sum of the information trigger window (ITW) and an end window trigger padding (EWP). An information alert is generated, if the current date time is greater than the theoretical trigger window (TTW) and less than the padded theoretical trigger window (PTTW).

TABLE 8

| Rule Type | C# Syntax |
| --- | --- |
| [Exception Trigger] ⊗ WorkerDark | @ "DateTime.UtcNow > DateTime.Parse(" "{{LST}}" ").ToUniversalTime( ).Add(TimeSpan.FromMinutes({{ETW}})) && DateTime.UtcNow < DateTime.Parse(" "{{LST}}" ").ToUniversalTime( ).Add(TimeSpan.FromMinutes({{ETW}} + {{EWP}}))"; |

Referencing Table 8, the C# Syntax above corresponds to an exception trigger for generating an exception alert based, in part, on when a worker was last sighted on the project. To generate the exception alert, a theoretical trigger window (TTW) is calculated from the sum of the last sighting time (LST) for the worker and the value for the exception trigger window (ETW). A padded theoretical trigger window (PTTW) is calculated from the last sighting time (LST) and the sum of the exception trigger window (ETW) and an end window trigger padding (EWP). An exception alert is generated, if the current date time is greater than the theoretical trigger window (TTW) and less than the padded theoretical trigger window (PTTW).

TABLE 9

| Type | C# Syntax |
| --- | --- |
| [Information Trigger] ① WorkerNoCheckin | @ "DateTime.UtcNow > DateTime.Parse(" "{{LST}}" ").ToUniversalTime( ).Add(TimeSpan.FromMinutes({{ITW}})) && DateTime.UtcNow < DateTime.Parse(" "{{LST}}" ").ToUniversalTime( ).Add(TimeSpan.FromMinutes({{ITW}} + {{EWP}})) && {{PCI}}==0 && DateTime.Parse(" "{{LST}}" ").ToUniversalTime( ).Subtract(DateTime.Parse(" "{{LST}}" ").ToUniversalTime( )).TotalMinutes >= {{ITW}}"; |

Referencing table 9, the C# Syntax above corresponds to an information trigger for generating an information alert based, in part, on if the worker has been sighted but has not checked into the project. To generate the information alert, a theoretical trigger window (TTW) is calculated from the sum of the last sighting time (LST) for the worker and the value for the information trigger window (ITW). A padded theoretical trigger window (PTTW) is calculated from the last sighting time (LST) and the sum of the information trigger window (ITW) and an end window trigger padding (EWP). A time since the last check-in time (TSLC) is calculated from the last sighting time (LST) and the last check-in time (LCT).

An information alert is generated under the following conditions:
1. the current date time is greater than the theoretical trigger window (TTW) and less than the padded theoretical trigger window (PTTW);
2. a project check-in flag (PCI) was not generated; and
3. the time since the last check-in time (TSLC) is greater than the information trigger window (ITW).

TABLE 10

| Rule Type | C# Syntax |
| --- | --- |
| [Exception Trigger] ⊗ WorkerNoCheckin | @ "DateTime.UtcNow > DateTime.Parse(" "{{LST}}" ").ToUniversalTime( ).Add(TimeSpan.FromMinutes({{ETW}})) && DateTime.UtcNow < DateTime.Parse(" "{{LST}}" ").ToUniversalTime( ).Add(TimeSpan.FromMinutes( {{ETW}} + {{EWP}} )) && {{PCI}}==0 && DateTime.Parse(" "{{LST}}" ").ToUniversalTime( ).Subtract(DateTime.Parse(" "{{LCT}}" ").ToUniversalTime( )).TotalMinutes >= {{ETW}}"; |

Referencing Table 10, the C# Syntax above corresponds to an exception trigger for generating an exception alert based, in part, on if the worker has been sighted but has not checked in to the project. To generate the exception alert, a theoretical trigger window (TTW) is calculated from the sum of the last sighting time (LST) for the worker and the value for the information trigger window (ITW). A padded theoretical trigger window (PTTW) is calculated from the last sighting time (LST) and the sum of the exception trigger window (ETW) and an end window trigger padding (EWP). A time since the last check-in time (TSLC) is calculated from the last sighting time (LST) and the last check-in time (LCT).

An exception alert is generated under the following conditions:
1. the current date time is greater than the theoretical trigger window (TTW) and less than the padded theoretical trigger window (PTTW);
2. a project check-in flag (PCI) was not generated; and
3. the time since the last check-in time (TSLC) is greater than the exception trigger window (ETW).

TABLE 11

| Type | C# Syntax |
| --- | --- |
| [Information Trigger] ① WorkerOvertime | @ "DateTime.UtcNow > DateTime.Parse(" "{{LCT}}" ").ToUniversalTime( ).Add(TimeSpan.FromMinutes( {{OTT}}+ {{ITW}} )) && DateTime.UtcNow < DateTime.Parse(" "{{LCT}}" ").ToUniversalTime( ).Add(TimeSpan.FromMinutes( {{ITW}} + {{OTT}} + {{EWP}} )) && {{PCI}}==1 && DateTime.UtcNow.Subtract(DateTime.Parse(" "{{LCT}}" ").ToUniversalTime( )).TotalMinutes >= {{OTT}})" |

Referencing Table 11, the C# Syntax above corresponds to an information trigger for generating an information alert based, in part, if a worker has been checked in for more than 8 hours on a project.

To generate the information alert, a theoretical trigger window (TTW) is calculated from the sum of an overtime threshold time (OTT) for the project and the value for the information trigger window (ITW). A padded theoretical trigger window (PTTW) is calculated from the overtime threshold time (OTT) and the sum of the information trigger window (ITW) and an end window trigger padding (EWP). A project checking (PCI) flag is detected. A theoretical worker total check-in time (TWTCT) is calculated from the difference between the last check-in time (LCT) and the current date and time. A checkout worker window is calculated.

An information alert is generated under the following conditions:
1. the current date time is greater than the overtime threshold time (OTT) and less than the padded theoretical trigger window (PTTW);
2. a project check-in flag (PCI) was generated; and
3. the theoretical worker total check-in time (TWTCT) is greater than or equal to the overtime threshold time (OTT).

TABLE 12

| Type | C# Syntax |
| --- | --- |
| [Exception Trigger] ⊗ WorkerOvertime | @ "DateTime.UtcNow > DateTime.Parse(" "{{LCT}}" ").ToUniversalTime( ).Add(TimeSpan.FromMinutes( {{OTT}} + {{ETW}} )) && DateTime.UtcNow < DateTime.Parse(" "{{LCT}}" ").ToUniversalTime( ).Add(TimeSpan.FromMinutes( {{ETW}} + {{OTT}} + {{EWP}} )) && {{PCI}}==1 && DateTime.UtcNow.Subtract(DateTime.Parse(" "{{LCT}}" ").ToUniversalTime( )).TotalMinutes >= {{OTT}})" |

Referencing Table 12, the C# Syntax above corresponds to an exception trigger for generating an exception alert based, in part, if a worker has been checked in for more than 8 hours on a project.

To generate the information alert, a theoretical trigger window (TTW) is calculated from the sum of an overtime threshold time (OTT) for the project and the value for the exception trigger window (ETW). A padded theoretical trigger window (PTTW) is calculated from the overtime threshold time (OTT) and the sum of the exception trigger window (ETW) and an end window trigger padding (EWP). A project checking (PCI) flag is detected. A theoretical worker total check-in time (TWTCT) is calculated from the difference between the last check-in time (LCT) and the current date and time. A checkout worker window is calculated.

An exception alert is generated under the following conditions:
1. the current date time is greater than the overtime threshold time (OTT) and less than the padded theoretical trigger window (PTTW);
2. a project check-in flag (PCI) was generated; and
3. the theoretical worker total check-in time (TWTCT) is greater than or equal to the overtime threshold time (OTT).

TABLE 13

| Rule Type | C# Syntax |
| --- | --- |
| [Information Trigger] ⊙ CollectorNoCheckin | @ "DateTime.UtcNow > DateTime.Parse(" "{{LCT}}" ").ToUniversalTime( ).Add(TimeSpan.FromMinutes({{ETW}})) && DateTimeUtc.Now < DateTime.Parse(" "{{LCT}}" ").ToUniversalTime( ).Add(TimeSpan.FromMinutes( {{ETW}}+ {{EWP}} )) && int.Parse(" "{{PCI}}" ") == 0)" |

The C# Syntax above corresponds to an information trigger for generating an information alert based, in part, if a mobile collector worker has checked into a project. To generate the information alert, a theoretical trigger window (TTW) is calculated from the sum of a last sighting time (LST) for the project and the value for the information trigger window (ITW). A padded theoretical trigger window (PTTW) is calculated from the last sighting time (LST) and the sum of the information trigger window (ITW) and an end window trigger padding (EWP). A project checking (PCI) flag is not detected.

An information alert is generated under the following conditions:
1. the current date time is greater than the theoretical trigger window (TTW) and less than the padded theoretical trigger window (PTTW);
2. a project check-in flag (PCI) was not generated; and
3. the theoretical worker total check-in time (TWTCT) is greater than or equal to the overtime threshold time (OTT).

TABLE 14

| Rule Type | C# Syntax |
| --- | --- |
| [Exception Trigger] ⊗ CollectorDark | @ "DateTime.UtcNow > DateTime.Parse(" "{{MCT}}" " ).ToUniversalTime( ).Add(TimeSpan.FromMinutes( {{ETW}} )) && DateTimeUtc.Now < DateTime.Parse( "| "{{MCT}}" " ).ToUniversalTime( ).Add(TimeSpan.FromMinutes( {{ETW}} + {{EWP}} ))" |

The C# Syntax above corresponds to an exception trigger for generating an exception alert based, in part, when the mobile collector last observed workers.

To generate the exception alert, a theoretical trigger window (TTW) is calculated from the sum of a last mobile collection time (MCT) and the value for the exception trigger window (ETW). A padded theoretical trigger window (PTTW) is calculated from the last mobile collection time (MCT) and the sum of the exception trigger window (ETW) and an end window trigger padding (EWP). An exception alert is generated when the current date time is greater than the theoretical trigger window (TTW) and less than the padded theoretical trigger window (PTTW).

Figure 9:
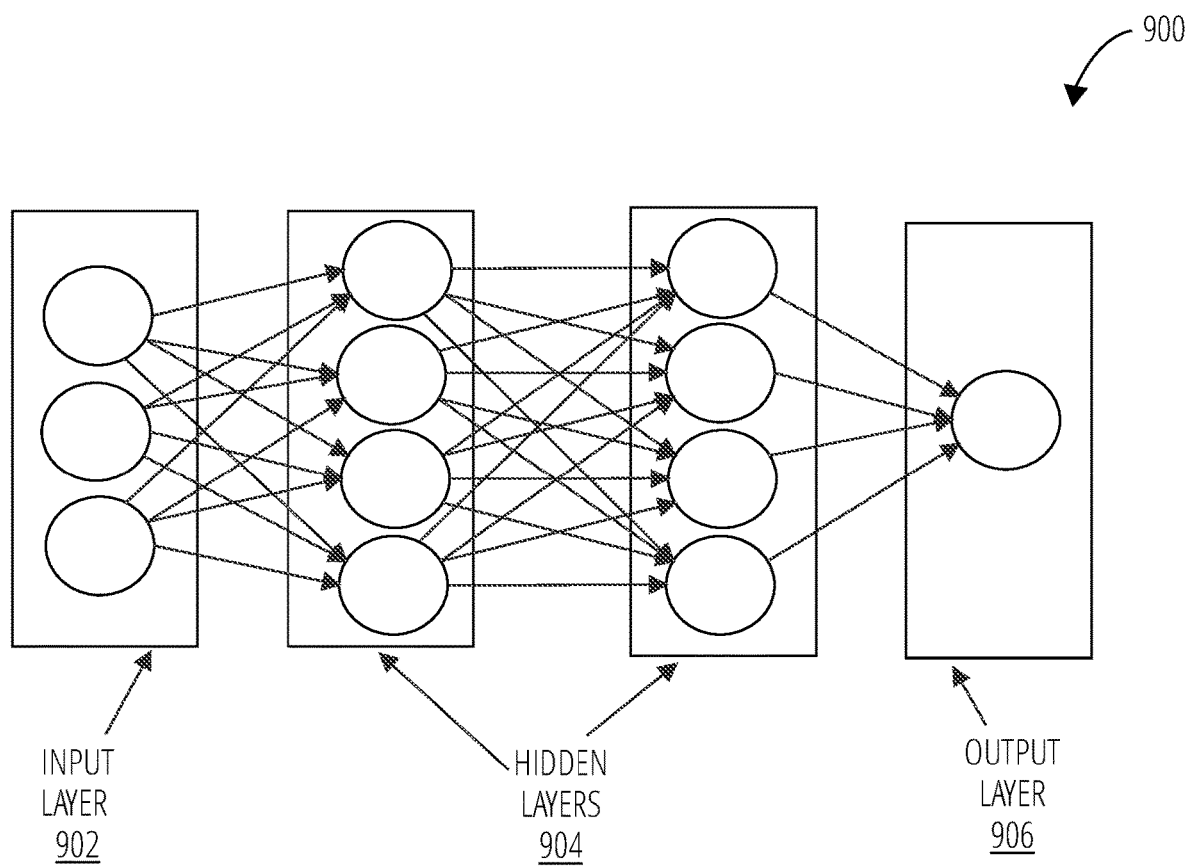
FIG. 9 illustrates a basic deep neural network 900 in accordance with one embodiment.

In some configurations, a machine learning algorithm may be implemented as a deep learning neural network. FIG. 9 illustrates a basic deep neural network 900 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 902), to the last layer (the output layer 906), possibly after traversing one or more intermediate layers, called hidden layers 904.

Figure 10:
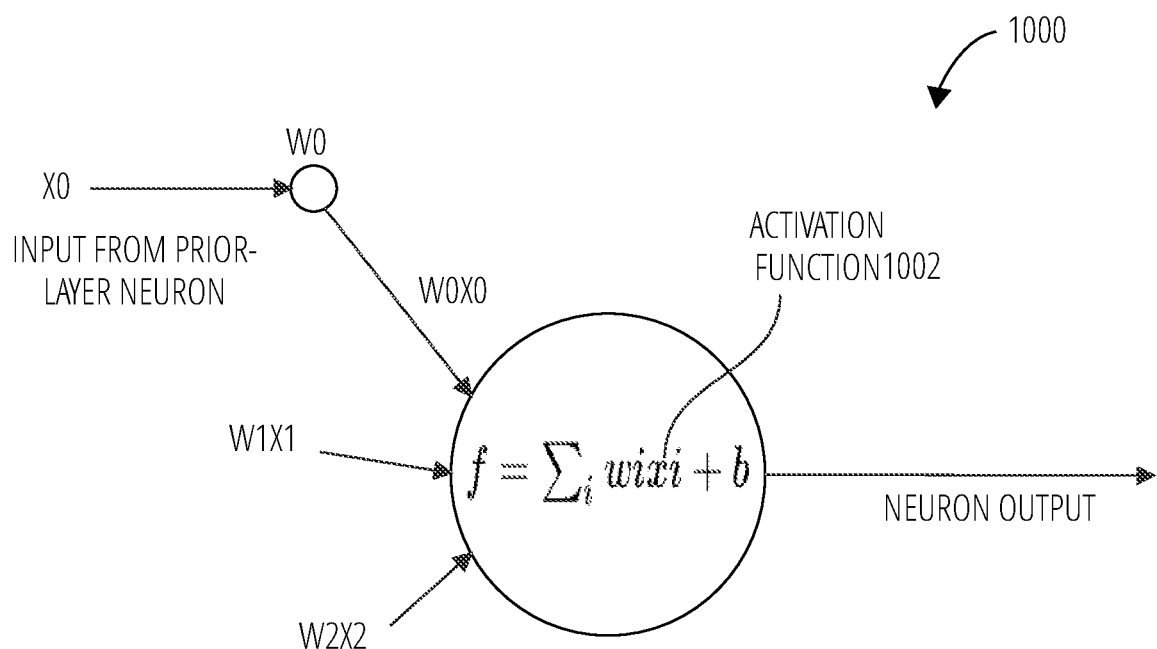
FIG. 10 illustrates an artificial neuron 1000 in accordance with one embodiment.

Referring to FIG. 10, an artificial neuron 1000 receiving inputs from predecessor neurons consists of the following components:

inputs $x_i$;

weights $w_i$ applied to the inputs;

an optional threshold (b), which stays fixed unless changed by a learning function; and an activation function 1002 that computes the output from the previous neuron inputs and threshold, if any.

An input neuron has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 1002 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

Figure 11:
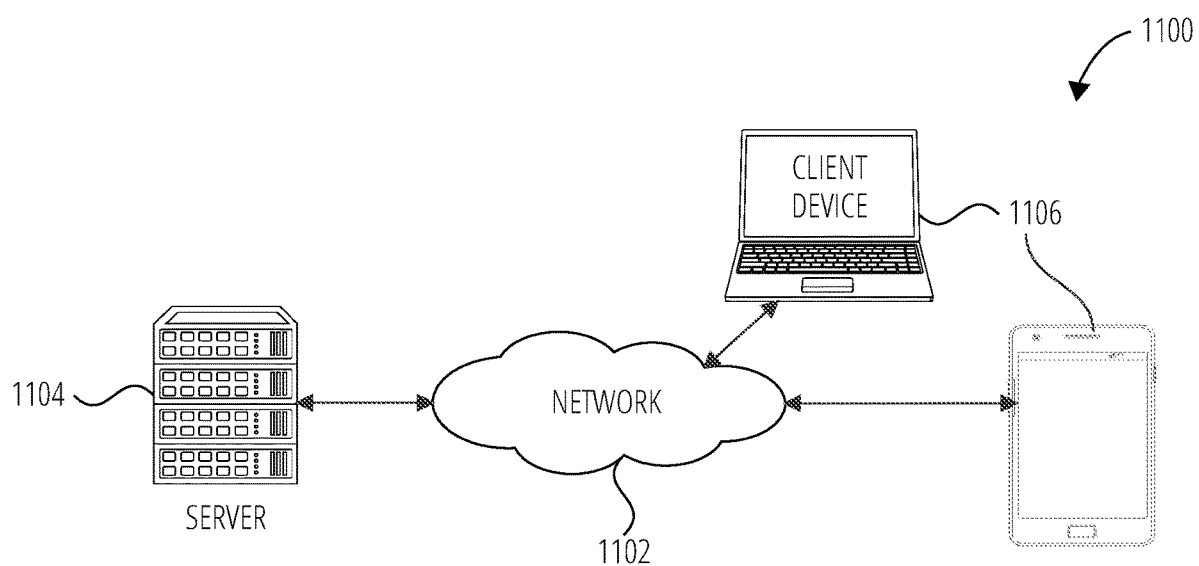
FIG. 11 illustrates a simplified system 1100 in which a server 1104 and a client device 1106 are communicatively coupled via a network 1102.

FIG. 11 illustrates a system 1100 in which a server 1104 and a client device 1106 are connected to a network 1102.

In various embodiments, the network 1102 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network 1102 may also include a voice network that conveys not only voice communications, but also non-voice data such as Short Message Service ("SMS") messages, as well as data communicated via various cellular data communication protocols, and the like.

In various embodiments, the client device 1106 may include desktop PCs, mobile phones, laptops, tablets, wearable computers, or other computing devices that are capable of connecting to the network 1102 and communicating with the server 1104, such as described herein.

In various embodiments, additional infrastructure (e.g., short message service centers, cell sites, routers, gateways, firewalls, and the like), as well as additional devices may be present. Further, in some embodiments, the functions described as being provided by some or all of the server 1104 and the client device 1106 may be implemented via various combinations of physical and/or logical devices. However, it is not necessary to show such infrastructure and implementation details in FIG. 11 in order to describe an illustrative embodiment.

Figure 12:
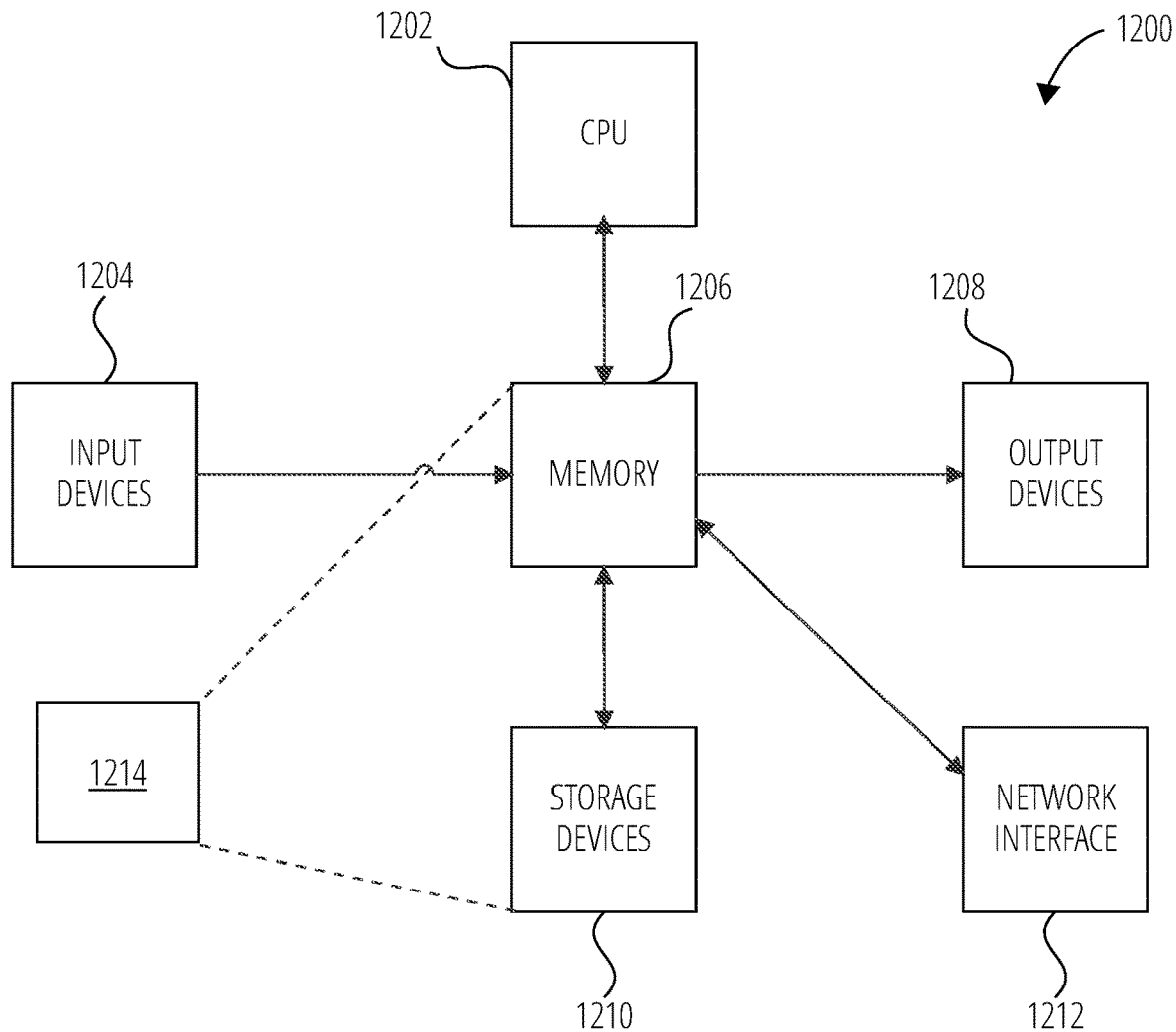
FIG. 12 illustrates an embodiment of an IoT device 1200 to implement components and process steps of the system described herein.

FIG. 12 illustrates an embodiment of an IoT device 1200 to implement components and process steps of IoT devices described herein.

Input devices 1204 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1204 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1204 are provided via various machine signal conductors (e.g., busses or network interfaces) and circuits to memory 1206.

The memory 1206 is typically what is known as a first or second level memory device, providing for storage (via configuration of matter or states of matter) of signals received from the input devices 1204, instructions and information for controlling operation of the CPU 1202, and signals from storage devices 1210.

The memory 1206 and/or the storage devices 1210 may store computer-executable instructions and thus forming logic 1214 that when applied to and executed by the CPU 1202 implement embodiments of the processes disclosed herein.

Information stored in the memory 1206 is typically directly accessible to the CPU 1202 of the device. Signals input to the device cause the reconfiguration of the internal material/energy state of the memory 1206, creating in essence a new machine configuration, influencing the behavior of the IoT device 1200 by affecting the behavior of the CPU 1202 with control signals (instructions) and data provided in conjunction with the control signals.

Second or third level storage devices 1210 may provide a slower but higher capacity machine memory capability. Examples of storage devices 1210 are hard disks, optical disks, large capacity flash memories or other non-volatile memory technologies, and magnetic memories.

The CPU 1202 may cause the configuration of the memory 1206 to be altered by signals in storage devices 1210. In other words, the CPU 1202 may cause data and instructions to be read from storage devices 1210 in the memory 1206 from which may then influence the operations of CPU 1202 as instructions and data signals, and from which it may also be provided to the output devices 1208. The CPU 1202 may alter the content of the memory 1206 by signaling to a machine interface of memory 1206 to alter the internal configuration, and then converted signals to the storage devices 1210 to alter its material internal configuration. In other words, data and instructions may be backed up from memory 1206, which is often volatile, to storage devices 1210, which are often non-volatile.

Output devices 1208 are transducers which convert signals received from the memory 1206 into physical phenomenon such as vibrations in the air, or patterns of light on a machine display, or vibrations (i.e., haptic devices) or patterns of ink or other materials (i.e., printers and 3-D printers).

The network interface 1212 receives signals from the memory 1206 and converts them into electrical, optical, or wireless signals to other machines, typically via a machine network. The network interface 1212 also receives signals from the machine network and converts them into electrical, optical, or wireless signals to the memory 1206.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method comprising:
   defining a sensor-host pairing and context metadata;
   receiving a plurality of sensor spatiotemporal sighting events of a sensor-host pair from a plurality of collection devices associated with an operating area;
   recording an identifier, signal strength, collection device location, and date and time for the plurality of sensor spatiotemporal sighting events in a controlled memory data structure;
   collecting a plurality of application events related to each sensor-host pair and storing the plurality of application events in the controlled memory data structure;
   constructing a behavioral model from the plurality of sensor spatiotemporal sighting events and the plurality of application events through operation of spatiotemporal tracking logic;
   collecting real time sighting events and real time application events from the plurality of collection devices in the operating area and comparing them to the behavioral model to identify inconsistent behavior from at least one sensor-host pair through operation of a behavior comparator; and
   generating an alert if the inconsistent behavior is identified and communicating the alert to at least one collection device through operation of a notification controller.

2. The method of claim 1, wherein the behavioral model identifies a spatiotemporal travel path by the sensor-host pair through the operating area.

3. The method of claim 1, wherein the spatiotemporal tracking logic utilizes a machine learning algorithm in the construction of the behavioral model.

4. The method of claim 3, wherein a deep learning neural network is utilized to construct the behavioral model for the at least one sensor-host pair utilizing the plurality of sensor spatiotemporal sighting events and the plurality of application events associated with the at least one sensor-host pair.

5. The method of claim 1, wherein the behavior comparator utilizes a machine learning algorithm in the identification of the inconsistent behavior.

6. The method of claim 1 further comprising:
   collecting the real time sighting events and the real time application events from the plurality of collection devices in the operating area for the at least one sensor-host pair in an event log;
   comparing the event log to a spatiotemporal tracking rule set comprising trigger parameters for at least one rule set alert; and
   generating a rule set alert for the at least one sensor-host pair for a collection of events in the event log matching the trigger parameters.

7. The method of claim 6, wherein the trigger parameters are dependent on current date and time.

8. The method of claim 6, wherein the spatiotemporal tracking logic utilizes rule set alerts in the construction of the behavioral model.

9. The method of claim 6, wherein the spatiotemporal tracking logic utilizes events logs to adjust the trigger parameters of the spatiotemporal tracking rule set.

10. A computing apparatus, the computing apparatus comprising:
    a processor; and
    a memory storing instructions that, when executed by the processor, configure the apparatus to:
      define a sensor-host pairing and context metadata;
      receive a plurality of sensor spatiotemporal sighting events of a sensor-host pair from a plurality of collection devices associated with an operating area;
      record an identifier, signal strength, collection device location, and date and time for the plurality of sensor spatiotemporal sighting events in a controlled memory data structure;
      collect a plurality of application events related to each sensor-host pair and storing the plurality of application events in the controlled memory data structure;
      construct a behavioral model from the plurality of sensor spatiotemporal sighting events and the plurality of application events through operation of spatiotemporal tracking logic;
      collect real time sighting events and real time application events from the plurality of collection devices in the operating area and comparing them to the behavioral model to identify inconsistent behavior from at least one sensor-host pair through operation of a behavior comparator; and
      generate an alert if the inconsistent behavior is identified and communicating the alert to at least one collection device through operation of a notification controller.

11. The computing apparatus of claim 10, wherein the behavioral model identifies a spatiotemporal travel path by the sensor-host pair through the operating area.

12. The computing apparatus of claim 10, wherein the spatiotemporal tracking logic utilizes a machine learning algorithm in the construction of the behavioral model.

13. The computing apparatus of claim 12, wherein a deep learning neural network is utilized to construct the behavioral model for the at least one sensor-host pair utilize the plurality of sensor spatiotemporal sighting events and the plurality of application events associated with the at least one sensor-host pair.

14. The computing apparatus of claim 10, wherein the behavior comparator utilizes a machine learning algorithm in the identification of the inconsistent behavior.

15. The computing apparatus of claim 10 wherein the instructions further configure the apparatus to:

collect the real time sighting events and the real time application events from the plurality of collection devices in the operating area for the at least one sensor-host pair in an event log;

compare the event log to a spatiotemporal tracking rule set comprising trigger parameters for at least one rule set alert; and generate a rule set alert for the at least one sensor-host pair for a collection of events in the event log matching the trigger parameters.

16. The computing apparatus of claim 15, wherein the trigger parameters are dependent on current date and time.

17. The computing apparatus of claim 15, wherein the spatiotemporal tracking logic utilizes rule set alerts in the construction of the behavioral model.

18. The computing apparatus of claim 15, wherein the spatiotemporal tracking logic utilizes events logs to adjust the trigger parameters of the spatiotemporal tracking rule set.

* * * * *